(12) United States Patent
Wang et al.

(10) Patent No.: US 11,794,912 B2
(45) Date of Patent: Oct. 24, 2023

(54) SYSTEMS AND METHODS FOR REDUCING EMISSIONS WITH A FUEL CELL

(71) Applicant: General Electric Company, Schenectady, NY (US)

(72) Inventors: Honggang Wang, Clifton Park, NY (US); Michael Anthony Benjamin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/568,254

(22) Filed: Jan. 4, 2022

(65) Prior Publication Data
US 2023/0211884 A1 Jul. 6, 2023

(51) Int. Cl.
*B64D 27/10* (2006.01)
*H01M 8/04111* (2016.01)
(Continued)

(52) U.S. Cl.
CPC ............... *B64D 27/10* (2013.01); *F02C 9/00* (2013.01); *H01M 8/04111* (2013.01);
(Continued)

(58) Field of Classification Search
CPC ..... F02C 9/00; B64D 27/10; B64D 2027/026; B64D 2041/005; H01M 8/04452;
(Continued)

(56) References Cited

U.S. PATENT DOCUMENTS 3,658,279 A 4/1972 Robertson
3,805,517 A 4/1974 Sewell et al.
(Continued)

FOREIGN PATENT DOCUMENTS

CN 106976405 A 7/2017
DE 102005012230 A1 10/2005
(Continued)

OTHER PUBLICATIONS

Babu D et al., Optimization of Pattern Factor of the Annular Gas Turbine Combustor for Better Turbine Life, IOSR Journal of Mechanical and Civil Engineering, pp. 30-35.
(Continued)

*Primary Examiner* — Jason H Duger
(74) *Attorney, Agent, or Firm* — Dority & Manning, P.A.

(57) ABSTRACT

A gas turbine engine includes a fuel cell assembly including a fuel cell stack and defining a fuel cell assembly operating parameter, a fuel source, and a turbomachine. The turbomachine includes a compressor section, a combustor, and a turbine section arranged in serial flow order. The combustor is configured to receive a flow of fuel from the fuel source and further configured to receive output products from the fuel cell stack. A controller is configured to perform operations including receiving data indicative of system operation conditions, determining a set of fuel cell operating conditions to move the system emission output into or maintain the system emission output within an emissions range, and controlling the fuel cell assembly operating parameter according to the determined set of fuel cell operating conditions.

18 Claims, 8 Drawing Sheets

(51) Int. Cl.
*H01M 8/04746* (2016.01)
*H01M 8/04992* (2016.01)
*H01M 8/04701* (2016.01)
*F02C 9/00* (2006.01)
*B64D 27/02* (2006.01)

(52) U.S. Cl.
CPC ... *H01M 8/04738* (2013.01); *H01M 8/04776* (2013.01); *H01M 8/04992* (2013.01); *B64D 2027/026* (2013.01); *H01M 2250/20* (2013.01)

(58) Field of Classification Search
CPC ......... H01M 8/04738; H01M 8/04776; H01M 8/04992; H01M 2250/20; H01M 8/0447; H01M 8/04111
See application file for complete search history.

(56) References Cited

U.S. PATENT DOCUMENTS

| | | | |
|---|---|---|---|
| 4,684,081 A | 8/1987 | Cronin | |
| 5,227,256 A | 7/1993 | Marianowski et al. | |
| 5,581,995 A | 12/1996 | Lucenko et al. | |
| 5,858,314 A | 1/1999 | Hsu et al. | |
| 5,968,680 A | 10/1999 | Wolfe et al. | |
| 6,183,703 B1 | 2/2001 | Hsu et al. | |
| 6,296,957 B1 | 10/2001 | Graage | |
| 6,348,278 B1 | 2/2002 | LaPierre et al. | |
| 6,630,264 B2 | 10/2003 | Haltiner, Jr. et al. | |
| 6,641,084 B1 | 11/2003 | Huber et al. | |
| 6,834,831 B2 | 12/2004 | Daggett | |
| 7,279,243 B2 | 10/2007 | Haltiner, Jr. et al. | |
| 7,285,350 B2 | 10/2007 | Keefer et al. | |
| 7,380,749 B2 | 6/2008 | Fucke et al. | |
| 7,456,517 B2 | 11/2008 | Campbell et al. | |
| 7,470,477 B2 | 12/2008 | Zizelman et al. | |
| 7,513,119 B2 | 4/2009 | Zielinski et al. | |
| 7,578,136 B2 | 8/2009 | Derouineau et al. | |
| 7,659,021 B2 | 2/2010 | Horiuchi et al. | |
| 7,709,118 B2 | 5/2010 | Lundberg | |
| 7,743,499 B2 | 6/2010 | Pettit et al. | |
| 7,781,115 B2 | 8/2010 | Lundberg | |
| 7,854,582 B2 | 12/2010 | Ullyott | |
| 7,926,287 B2 | 4/2011 | Ullyott et al. | |
| 7,966,801 B2 | 6/2011 | Umeh et al. | |
| 7,966,830 B2 | 6/2011 | Daggett | |
| 8,141,360 B1 | 3/2012 | Huber | |
| 8,232,670 B2 | 7/2012 | Breit et al. | |
| 8,268,510 B2 | 9/2012 | Rock et al. | |
| 8,288,060 B2 | 10/2012 | Bae et al. | |
| 8,309,270 B2 | 11/2012 | Finnerty et al. | |
| 8,373,381 B2 | 2/2013 | Raiser et al. | |
| 8,394,552 B2 | 3/2013 | Gummalla et al. | |
| 8,524,412 B2 | 9/2013 | Rock et al. | |
| 8,722,270 B2 | 5/2014 | Pastula et al. | |
| 8,727,270 B2 | 5/2014 | Burns et al. | |
| 8,732,532 B2 | 5/2014 | Higeta | |
| 8,820,677 B2 | 9/2014 | Rajashekara et al. | |
| 8,846,255 B2 | 9/2014 | Dineen | |
| 8,875,519 B2 | 11/2014 | Dooley | |
| 8,950,703 B2 | 2/2015 | Bayliss et al. | |
| 9,005,847 B2 | 4/2015 | Rock et al. | |
| 9,028,990 B2 | 5/2015 | Gans et al. | |
| 9,054,385 B2 | 6/2015 | Jones et al. | |
| 9,059,440 B2 | 6/2015 | Hotto | |
| 9,068,748 B2 | 6/2015 | Hoke | |
| 9,118,054 B2 | 8/2015 | Gummalla et al. | |
| 9,347,379 B2 | 5/2016 | Dooley | |
| 9,359,956 B2 | 6/2016 | Dooley | |
| 9,435,230 B2 | 9/2016 | Kim et al. | |
| 9,444,108 B2 | 9/2016 | Brousseau | |
| 9,464,573 B2 | 10/2016 | Remy et al. | |
| 9,541,001 B2 | 1/2017 | Steinwandel et al. | |
| 9,604,730 B2 | 3/2017 | Hagh et al. | |
| 9,617,006 B2 | 4/2017 | Brugger et al. | |
| 9,666,888 B2 | 5/2017 | Nagai et al. | |
| 9,777,638 B2 | 10/2017 | Freidl | |
| 9,897,041 B2 | 2/2018 | Hoffjann et al. | |
| 9,966,619 B2 | 5/2018 | Libis et al. | |
| 10,008,726 B2 | 6/2018 | Leah et al. | |
| 10,035,607 B2 | 7/2018 | Wangemann et al. | |
| 10,069,150 B2 | 9/2018 | Mata et al. | |
| 10,224,556 B2 | 3/2019 | Lents et al. | |
| 10,318,003 B2 | 6/2019 | Gannon et al. | |
| 10,443,504 B2 | 10/2019 | Dalal | |
| 10,446,858 B2 | 10/2019 | Palumbo et al. | |
| 10,487,839 B2 | 11/2019 | Kupiszewski et al. | |
| 10,622,653 B2 | 4/2020 | Whyatt et al. | |
| 10,641,179 B2 | 5/2020 | Hayama et al. | |
| 10,644,331 B2 | 5/2020 | Stoia et al. | |
| 10,671,092 B2 | 6/2020 | DiRusso et al. | |
| 10,676,208 B2 | 6/2020 | Wangemann et al. | |
| 10,724,432 B2 | 7/2020 | Shapiro et al. | |
| 10,737,802 B2 | 8/2020 | Krug et al. | |
| 10,762,726 B2 | 9/2020 | Gansler et al. | |
| 10,766,629 B2 | 9/2020 | Mercier-Calvairac et al. | |
| 10,774,741 B2 | 9/2020 | Sennoun | |
| 10,814,992 B2 | 10/2020 | Halsey et al. | |
| 10,913,543 B2 | 2/2021 | Bailey et al. | |
| 10,919,635 B2 | 2/2021 | Edgar et al. | |
| 10,967,984 B2 | 4/2021 | Willford et al. | |
| 10,978,723 B2 | 4/2021 | Lo et al. | |
| 2002/0163819 A1 | 11/2002 | Treece | |
| 2004/0024516 A1* | 2/2004 | Hook | F02C 9/28 |
| | | | 701/100 |
| 2004/0081871 A1 | 4/2004 | Kearl et al. | |
| 2004/0150366 A1 | 8/2004 | Ferrall et al. | |
| 2006/0010866 A1 | 1/2006 | Rehg et al. | |
| 2008/0155984 A1 | 7/2008 | Liu et al. | |
| 2010/0133475 A1 | 6/2010 | Kobayashi et al. | |
| 2010/0159303 A1 | 6/2010 | Rock et al. | |
| 2011/0071707 A1 | 3/2011 | Crumm et al. | |
| 2012/0161512 A1 | 6/2012 | Metzler et al. | |
| 2012/0301814 A1 | 11/2012 | Beasley et al. | |
| 2013/0099560 A1 | 4/2013 | Shipley et al. | |
| 2013/0280634 A1 | 10/2013 | Park et al. | |
| 2014/0023945 A1 | 1/2014 | Epstein et al. | |
| 2014/0325991 A1 | 11/2014 | Liew et al. | |
| 2015/0030947 A1 | 1/2015 | Saunders et al. | |
| 2015/0151844 A1 | 6/2015 | Anton et al. | |
| 2016/0260991 A1 | 9/2016 | Shapiro et al. | |
| 2017/0070088 A1 | 3/2017 | Bemsten et al. | |
| 2018/0003072 A1 | 1/2018 | Lents et al. | |
| 2018/0141675 A1 | 5/2018 | Halsey et al. | |
| 2018/0166734 A1 | 6/2018 | Linde et al. | |
| 2018/0319283 A1 | 11/2018 | Battin et al. | |
| 2019/0121369 A1 | 4/2019 | DiRusso et al. | |
| 2019/0136761 A1* | 5/2019 | Shapiro | H01M 8/04201 |
| 2019/0145273 A1 | 5/2019 | Frank et al. | |
| 2019/0173109 A1* | 6/2019 | Wang | H01M 8/04089 |
| 2020/0014044 A1 | 1/2020 | Tichy et al. | |
| 2020/0062414 A1 | 2/2020 | Hon et al. | |
| 2020/0136163 A1 | 4/2020 | Holland et al. | |
| 2020/0149479 A1 | 5/2020 | Des Roches-Dionne et al. | |
| 2020/0194799 A1 | 6/2020 | Hart et al. | |
| 2020/0313207 A1 | 10/2020 | Milcarek et al. | |
| 2021/0003281 A1 | 1/2021 | Amble et al. | |
| 2021/0075034 A1 | 3/2021 | Irie et al. | |
| 2021/0115857 A1 | 4/2021 | Collopy | |

FOREIGN PATENT DOCUMENTS

| | | | |
|---|---|---|---|
| EP | 3805107 A1 | 4/2021 | |
| JP | 2009187756 A | 8/2009 | |
| JP | 2011002308 A | 1/2011 | |
| JP | 2018087501 A | 6/2018 | |
| KR | 20090064853 A | 6/2009 | |
| WO | WO2018108962 A1 | 6/2018 | |
| WO | WO2020/011380 A1 | 1/2020 | |

OTHER PUBLICATIONS

Cocker et al., 3D Printing Cuts Fuel Cell Component Costs, Energy

(56) References Cited

OTHER PUBLICATIONS and Environmental Science Article featured in Chemistry World, Jul. 3, 2014, 3 Pages. https://www.chemistryworld.com/news/3d-printing-cuts-fuel-cell-component-costs/7526.article.

Code of Federal Regulations, National Archives, Title 14, Chapter I, Subchapter C, Part 33, §33.75 Safety Analysis, 2007, refer to p. 25 of 50. https://www.ecfr.gov/cgi-bin/text-idx?SID=5e1a000b517423bb51a8f713ca211b68&mc=true&node=pt14.1.33&rgn=div5#se14.1.33_175.

Honegger, Gas Turbine Combustion Modeling for a Parametric Emissions Monitoring System, Thesis Kansas State University College of Engineering, Manhattan Kansas, 2004, 97 Pages. https://core.ac.uk/download/pdf/5164453.pdf.

Krishnan, Recent Developments in Metal-Supported Solid Oxide Fuel Cells, Wires Energy and Environment, vol. 6, Issue 5, Mar. 30, 2017, 34 Pages. (Abstract Only) https://doi.org/10.1002/wene.246.

Mark et al., Design and Analysis of Annular Combustion Chamber of a Low Bypass Turbofan Engine in a Jet Trainer Aircraft, Propulsion and Power Research, vol. 5, Issue 2, 2015, pp. 97-107.

Thorud, Dynamic Modelling and Characterisation of a Solid Oxide Fuel Cell Integrated in a Gas Turbine Cycle, Trondheim, NTNU, Oct. 2005, 278 Pages.

Turbine Engine Relighting in Flight, Certification Memorandum, CM-PIFS-010, European Aviation Safety Agency (EASA), Issue 1, Apr. 29, 2015, 6 Pages.

Whyatt et al., Electrical Generation for More-Electric Aircraft Using Solid Oxide Fuel Cells, No. PNNL-21382, Pacific Northwest National Lab (PNNL), Richland WA, 2012, 110 Pages. https://www.energy.gov/sites/prod/files/2014/03/f9/sofc_for_aircraft_pnnl_2012.pdf.

\* cited by examiner

| 522 | 530 | 524 | | | | | | |
|---|---|---|---|---|---|---|---|---|
| $n_1$ | $m_1$ | $x_{11}$ | $x_{12}$ | $x_{13}$ | $x_{14}$ | $x_{15}$ | $x_{16}$ | $x_{17}$ |
| $n_1$ | $m_2$ | $x_{21}$ | $x_{22}$ | $x_{23}$ | $x_{24}$ | $x_{25}$ | $x_{26}$ | $x_{27}$ |
| $n_1$ | $m_3$ | $x_{31}$ | $x_{32}$ | $x_{33}$ | $x_{34}$ | $x_{35}$ | $x_{36}$ | $x_{37}$ |
| $n_2$ | $m_1$ | $x_{41}$ | $x_{42}$ | $x_{43}$ | $x_{44}$ | $x_{45}$ | $x_{46}$ | $x_{47}$ |
| $n_2$ | $m_2$ | $x_{51}$ | $x_{52}$ | $x_{53}$ | $x_{54}$ | $x_{55}$ | $x_{56}$ | $x_{57}$ |
| $n_2$ | $m_3$ | $x_{61}$ | $x_{62}$ | $x_{63}$ | $x_{64}$ | $x_{65}$ | $x_{66}$ | $x_{67}$ |
| $n_3$ | $m_1$ | $x_{71}$ | $x_{72}$ | $x_{73}$ | $x_{74}$ | $x_{75}$ | $x_{76}$ | $x_{77}$ |
| $n_3$ | $m_2$ | $x_{81}$ | $x_{82}$ | $x_{83}$ | $x_{84}$ | $x_{85}$ | $x_{86}$ | $x_{87}$ |
| $n_3$ | $m_3$ | $x_{91}$ | $x_{92}$ | $x_{93}$ | $x_{94}$ | $x_{95}$ | $x_{96}$ | $x_{97}$ |

SYSTEMS AND METHODS FOR REDUCING EMISSIONS WITH A FUEL CELL

FIELD

The present disclosure relates to a system and method for controlling emissions of a gas turbine engine, the propulsion system including a fuel cell.

BACKGROUND

A gas turbine engine generally includes a turbomachine and a rotor assembly. Gas turbine engines, such as turbofan engines, may be used for aircraft propulsion. In the case of a turbofan engine, the turbomachine includes a compressor section, a combustion section, and a turbine section in serial flow order, and the rotor assembly is configured as a fan assembly.

During operation, air is compressed in the compressor and mixed with fuel and ignited in the combustion section for generating combustion gases which flow downstream through the turbine section. The turbine section extracts energy therefrom for rotating the compressor section and fan assembly to power the gas turbine engine and propel an aircraft incorporating such a gas turbine engine in flight.

Combustor power is adjusted to meet fan speed demand or thrust demand. A temperature of a combustor of the combustion section may be dependent on the combustor power and may be an operating limit of the gas turbine engine. Accordingly, achieving a combustor power may cause the combustor temperature to change in a way that increases emissions. If a combustor temperature is too low, there may be an increase in carbon monoxide (CO). And, if a combustor temperature is too high, there may be an increase in nitrogen oxides ($NO_x$). Accordingly, systems and methods that are able to achieve a desired combustor power while reducing emissions would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
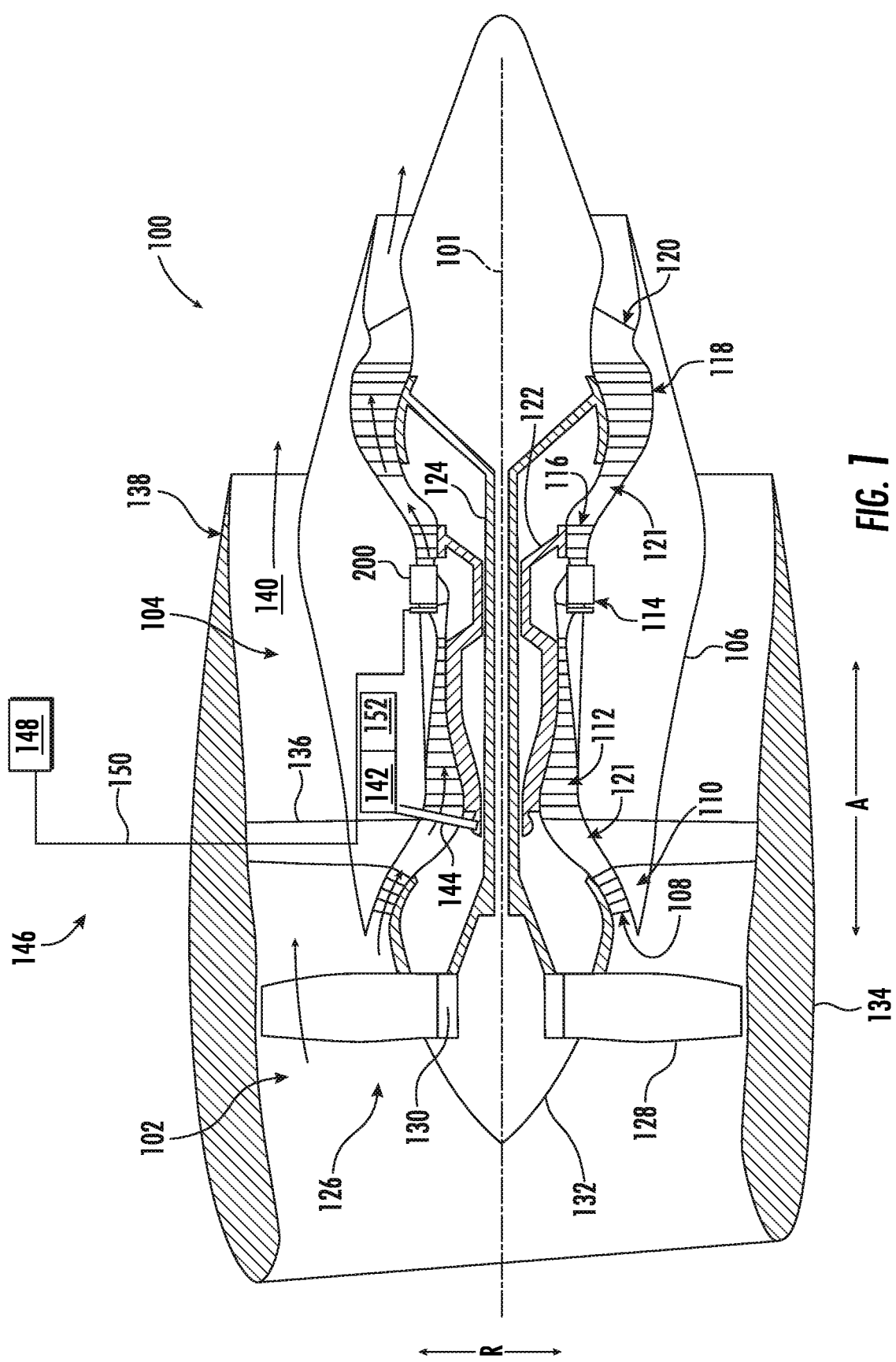
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For purposes of the description hereinafter, the terms "upper", "lower", "right", "left", "vertical", "horizontal", "top", "bottom", "lateral", "longitudinal", and derivatives thereof shall relate to the embodiments as they are oriented in the drawing figures. However, it is to be understood that the embodiments may assume various alternative variations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" or "at least one of A, B, or C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

The term "equivalence ratio" refers to the ratio of the actual fuel/air ratio to the stoichiometric fuel/air ratio. Stoichiometric combustion occurs when all the oxygen is consumed in the reaction, and there is no molecular oxygen ($O_2$) in the products.

If the equivalence ratio is equal to one, the combustion is stoichiometric. If it is <1, the combustion is lean (fuel lean) with excess air, and if it is >1, the combustion is rich (fuel rich) with incomplete combustion. The equivalence ratio is inverse to the air to fuel ratio.

The exhaust from an aircraft gas turbine is composed of CO, carbon dioxide (CO2), water vapor ($H_2O$), unburned hydrocarbons (UHC), particulate matter (mainly carbon), $NO_x$, and excess atmospheric oxygen and nitrogen. It may be desirable to limit the CO and $NO_x$ components of the exhaust.

System and methods are provided for reducing emissions for a propulsion system of an aircraft with a fuel cell.

The aircraft may include an aircraft fuel supply. The propulsion system may include a fuel cell assembly defining a fuel cell assembly operating parameter and including a fuel cell and, e.g., an air processing unit, a fuel processing unit, and a power converter. The propulsion system may also include a turbomachine comprising a compressor section, a combustor, and a turbine section arranged in serial flow order. The combustor may be configured to receive a flow of aviation fuel from the aircraft fuel supply and may further be configured to receive the output products from the fuel cell.

The system further includes a controller. The controller is generally configured to receive data indicative of a fan speed demand or thrust demand and a temperature of the combustor. The controller may determine a set of fuel cell operating conditions to meet the thrust demand and maintain the temperature of the combustor within a temperature limit; and may further control the fuel cell assembly operating parameter according to the determined set of fuel cell operating conditions to maintain the temperature of the combustor within a temperature limit (e.g., an emissions temperature limit).

More specifically, the controller may determine a first set of fuel cell operating conditions in response to determining that the temperature of the combustor is approaching or has fallen below a lower limit of a temperature range, and a second set of fuel cell operating conditions in response to determining that the temperature of the combustor is approaching or has exceeded an upper limit of the temperature range.

In response to determining the first set of fuel cell operating conditions or the second set of operating conditions, the controller controls the fuel cell assembly operating parameter, which in at least certain exemplary aspects may include controlling at least one of the air processing unit, the fuel processing unit, and the power converter, according to the determined one of the first set of fuel cell operating conditions and the second set of fuel cell operating conditions.

Controlling according to the first set of fuel cell operating conditions (a "low temperature control") may include increasing the temperature of the combustor (e.g., the flame temperature) which accelerates the rate of oxidation and improves the efficiency of combustion so that carbon monoxide (CO) emissions decline. For example, controlling according to the first set of fuel cell operating conditions may include increasing the exhaust temperature of the fuel cell, increasing the equivalence ratio of the output products from the fuel cell (e.g., hydrogen-rich fuel), increasing the fuel utilization of the fuel cell (to send less $H_2$ fuel and more air to facilitate more complete combustion within the combustion chamber), and reducing the direct fuel to the combustor from the fuel cell assembly.

Controlling according to the second set of fuel cell operating conditions (a "high temperature control method") may include decreasing the temperature of the combustor (e.g., the flame temperature) which provides a higher-purity exhaust stream that may quench nitrogen oxides ($NO_x$) reactions and/or acts as a vaporizer to reduce $NO_x$. Controlling according to the second set of fuel cell operating conditions may include increasing the current that is drawn from the fuel cell and injecting combustion gases from a fuel cell toward or at an exit of the combustor. By increasing the current that is drawn from the fuel cell, more hydrogen is consumed in the fuel cell and less fuel is exhausted into the combustor. By injecting combustion gases from a fuel cell toward an exit of the combustor, the residence time of the gases in the combustor is reduced, thereby lowering $NO_x$.

A system and method of the present disclosure may generally result in lower emissions while maintaining a fan speed demand or thrust demand. Such a decrease in emissions is provided while achieving a fan speed demand or thrust demand.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable vehicle.

For the embodiment depicted, the engine is configured as a high bypass gas turbine engine 100. As shown in FIG. 1, the gas turbine engine 100 defines an axial direction A (extending parallel to a centerline axis 101 provided for reference), a radial direction R, and a circumferential direction (extending about the axial direction A; not depicted in FIG. 1). In general, the gas turbine engine 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet exhaust nozzle section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the centerline axis 101 by the LP shaft 124. The disk 130 is covered by a rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

In such a manner, it will be appreciated that gas turbine engine 100 generally includes a first stream (e.g., core air flowpath 121) and a second stream (e.g., bypass airflow passage 140) extending parallel to the first stream. In certain exemplary embodiments, the gas turbine engine 100 may further define a third stream extending, e.g., from the LP compressor 110 to the bypass airflow passage 140 or to ambient. With such a configuration, the LP compressor 110 may generally include a first compressor stage configured as a ducted mid-fan and downstream compressor stages. An inlet to the third stream may be positioned between the first compressor stage and the downstream compressor stages.

Referring still to FIG. 1, the gas turbine engine 100 additionally includes an accessory gearbox 142 and a fuel delivery system 146. For the embodiment shown, the accessory gearbox 142 is located within the cowling/outer casing 106 of the turbomachine 104. Additionally, it will be appreciated that for the embodiment depicted schematically in FIG. 1, the accessory gearbox 142 is mechanically coupled to, and rotatable with, one or more shafts or spools of the turbomachine 104. For example, in the exemplary embodiment depicted, the accessory gearbox 142 is mechanically coupled to, and rotatable with, the HP shaft 122 through a suitable geartrain 144. The accessory gearbox 142 may provide power to one or more suitable accessory systems of the gas turbine engine 100 during at least certain operations, and may further provide power back to the gas turbine engine 100 during other operations. For example, the accessory gearbox 142 is, for the embodiment depicted, coupled to a starter motor/generator 152. The starter motor/generator may be configured to extract power from the accessory gearbox 142 and gas turbine engine 100 during certain operation to generate electrical power, and may provide power back to the accessory gearbox 142 and gas turbine engine 100 (e.g., to the HP shaft 122) during other operations to add mechanical work back to the gas turbine engine 100 (e.g., for starting the gas turbine engine 100).

Moreover, the fuel delivery system 146 generally includes a fuel source 148, such as a fuel tank, and one or more fuel delivery lines 150. The one or more fuel delivery lines 150 provide a fuel flow through the fuel delivery system 146 to the combustion section 114 of the turbomachine 104 of the gas turbine engine 100. As will be discussed in more detail below, the combustion section 114 includes an integrated fuel cell and combustor assembly 200. The one or more fuel delivery lines 150, for the embodiment depicted, provide a flow of fuel to the integrated fuel cell and combustor assembly 200.

It will be appreciated, however, that the exemplary gas turbine engine 100 depicted in FIG. 1 is provided by way of example only. In other exemplary embodiments, any other suitable gas turbine engine may be utilized with aspects of the present disclosure. For example, in other embodiments, the turbofan engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc. Further, although the exemplary gas turbine engine depicted in FIG. 1 is shown schematically as a direct drive, fixed-pitch turbofan engine, in other embodiments, a gas turbine engine of the present disclosure may be a geared gas turbine engine (i.e., including a gearbox between the fan 126 and a shaft driving the fan, such as the LP shaft 124), may be a variable pitch gas turbine engine (i.e., including a fan 126 having a plurality of fan blades 128 rotatable about their respective pitch axes), etc. Moreover, although the exemplary gas turbine engine 100 includes a ducted fan 126, in other exemplary aspects, the gas turbine engine 100 may include an unducted fan 126 (or open rotor fan), without the nacelle 134. Further, although not depicted herein, in other embodiments the gas turbine engine may be any other suitable type of gas turbine engine, such as a nautical gas turbine engine.

Figure 2:
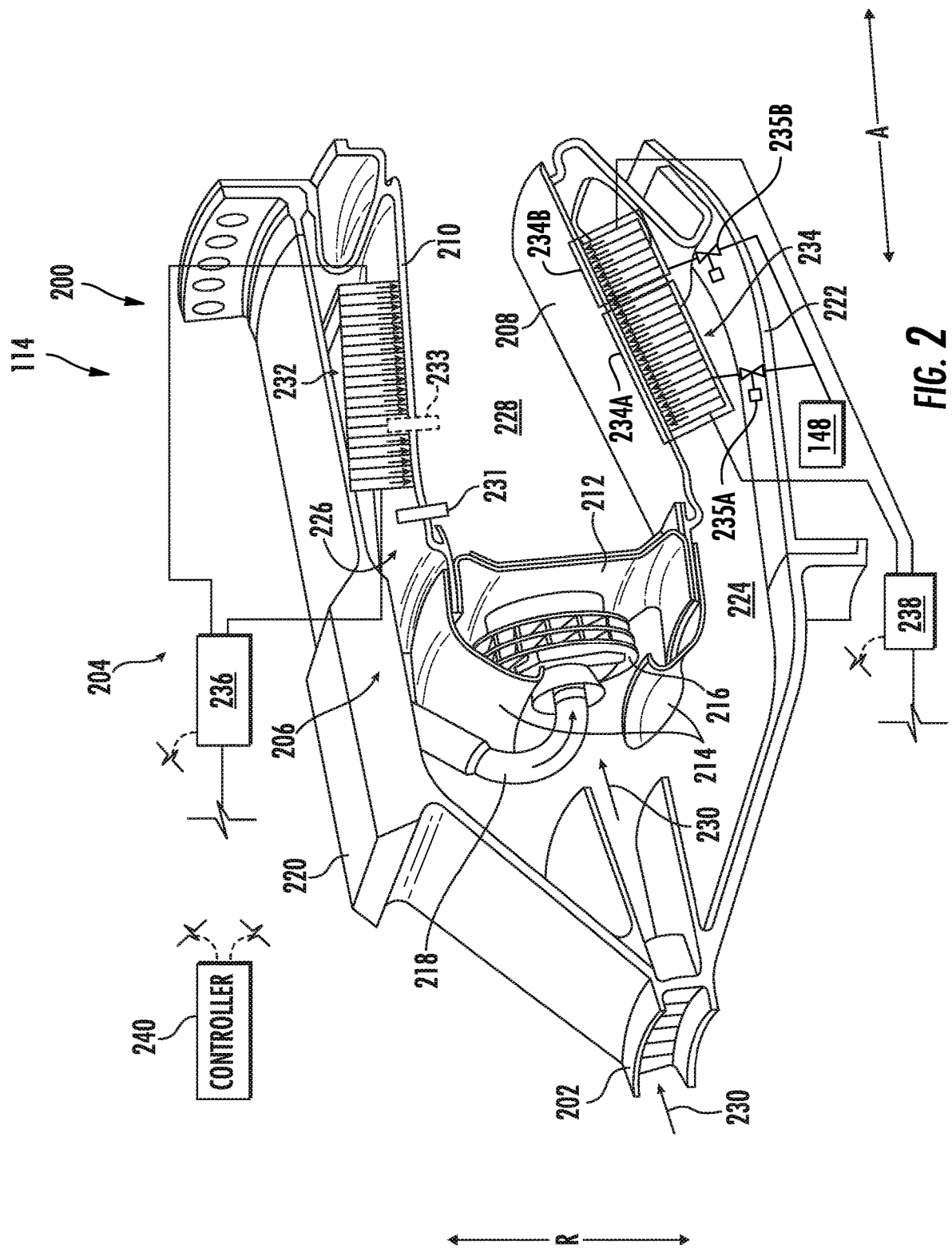
FIG. 2 is a perspective view of an integrated fuel cell and combustor assembly in accordance with the present disclosure.

Referring now to FIG. 2, FIG. 2 illustrates schematically a portion of the combustion section 114 including a portion of the integrated fuel cell and combustor assembly 200 used in the gas turbine engine 100 of FIG. 1 (described as a gas turbine engine 100 above with respect to FIG. 1), according to an embodiment of the present disclosure.

As will be appreciated, the combustion section 114 includes a compressor diffuser nozzle 202 and extends between an upstream end and a downstream end generally along the axial direction A. The combustion section 114 is fluidly coupled to the compressor section at the upstream end via the compressor diffuser nozzle 202 and to the turbine section at the downstream end.

The integrated fuel cell and combustor assembly 200 generally includes a fuel cell assembly 204 (only partially depicted in FIG. 2; see also FIGS. 3 through 5) and a combustor 206. The combustor 206 includes an inner liner 208, an outer liner 210, a dome assembly 212, a cowl assembly 214, a swirler assembly 216, and a fuel flowline 218. The combustion section 114 generally includes an outer casing 220 outward of the combustor 206 along the radial direction R to enclose the combustor 206 and an inner casing 222 inward of the combustor 206 along the radial direction R. The inner casing 222 and inner liner 208 define an inner passageway 224 therebetween, and the outer casing 220 and outer liner 210 define an outer passageway 226 therebetween. The inner casing 222, the outer casing 220, and the dome assembly 212 together define at least in part a combustion chamber 228 of the combustor 206.

The dome assembly 212 is disposed proximate the upstream end of the combustion section 114 (i.e., closer to the upstream end than the downstream end) and includes an opening (not labeled) for receiving and holding the swirler assembly 216. The swirler assembly 216 also includes an opening for receiving and holding the fuel flowline 218. The fuel flowline 218 is further coupled to the fuel source 148 (see FIG. 1) disposed outside the outer casing 220 along the radial direction R and configured to receive the fuel from the fuel source 148. In such a manner, the fuel flowline 218 may be fluidly coupled to the one or more fuel delivery lines 150 described above with reference to FIG. 1.

The swirler assembly 216 can include a plurality of swirlers (not shown) configured to swirl the compressed fluid before injecting it into the combustion chamber 228 to generate combustion gas. The cowl assembly 214, in the embodiment depicted, is configured to hold the inner liner 208, the outer liner 210, the swirler assembly 216, and the dome assembly 212 together.

During operation, the compressor diffuser nozzle 202 is configured to direct a compressed fluid 230 from the compressor section to the combustor 206, where the compressed fluid 230 is configured to be mixed with fuel within the swirler assembly 216 and combusted within the combustion chamber 228 to generate combustion gasses. The combustion gasses are provided to the turbine section to drive one or more turbines of the turbine section (e.g., the high pressure turbine 116 and low pressure turbine 118).

During operation of the gas turbine engine 100 including the integrated fuel cell and combustor assembly 200, a flame within the combustion chamber 228 is maintained by a continuous flow of fuel and air. In order to provide for an ignition of the fuel and air, e.g., during a startup of the gas turbine engine 100, the integrated fuel cell and combustor assembly 200 further includes an ignitor 231. The ignitor 231 may provide a spark or initial flame to ignite a fuel and air mixture within the combustion chamber 228. In certain exemplary embodiments, the integrated fuel cell and combustor assembly 200 may additionally include a dedicated fuel cell ignitor 233 (depicted in phantom). In particular, for the embodiment of FIG. 2, the dedicated fuel cell ignitor 233 is positioned downstream of at least a portion of a fuel cell, and in particular of a fuel cell stack (described below). In such a manner, the dedicated fuel cell ignitor 233 may more effectively combust output products of the fuel cell.

As mentioned above and depicted schematically in FIG. 2, the integrated fuel cell and combustor assembly 200 further includes the fuel cell assembly 204. The exemplary fuel cell assembly 204 depicted includes a first fuel cell stack 232 and a second fuel cell stack 234. More specifically, the first fuel cell stack 232 is configured with the outer liner 210 and the second fuel cell stack 234 is configured with the inner liner 208. More specifically, still, the first fuel cell stack 232 is integrated with the outer liner 210 and the second fuel cell stack 234 is integrated with the inner liner 208. Operation of the fuel cell assembly 204, and more specifically of a fuel cell stack (e.g., first fuel cell stack 232 or second fuel cell stack 234) of the fuel cell assembly 204 will be described in more detail below.

For the embodiment depicted, the fuel cell assembly 204 is configured as a solid oxide fuel cell ("SOFC") assembly, with the first fuel cell stack 232 configured as a first SOFC fuel cell stack and the second fuel cell stack 234 configured as a second SOFC fuel cell stack (each having a plurality of SOFC's). As will be appreciated, a SOFC is generally an electrochemical conversion device that produces electricity directly from oxidizing a fuel. In generally, fuel cell assemblies, and in particular fuel cells, are characterized by an electrolyte material utilized. The SOFC's of the present disclosure may generally include a solid oxide or ceramic electrolyte. This class of fuel cells generally exhibit high combined heat and power efficiency, long-term stability, fuel flexibility, and low emissions.

In certain embodiments, the fuel cell assembly 204 includes a plurality of fuel cell stacks that are distributed along the axial direction A of the combustor 206. Fuel to the plurality of fuel cell stacks (e.g., from the fuel source 148 or through elements of the fuel cell and combustor assembly 200 described herein) may be varied to distribute fuel to the combustor 206 along the axial direction A of the combustor 206.

For example, a "late lean" approach uses more fuel burned at a downstream end of the combustor 206. The "late lean" approach may be implemented to reduce a residence time of the fuel in the combustor 206.

For purposes of illustration, the second fuel cell stack 234 includes an upstream fuel cell stack 234A and a downstream fuel cell stack 234B. Fuel flow from the fuel source 148 to the upstream fuel cell stack 234A may be controlled by a valve 235A and fuel flow from the fuel source 148 to the downstream fuel cell stack 234B may be controlled by a valve 235B. It should be understood that the first fuel cell stack 232 may be similarly arranged to be distributed along the axial direction A.

Figure 3:
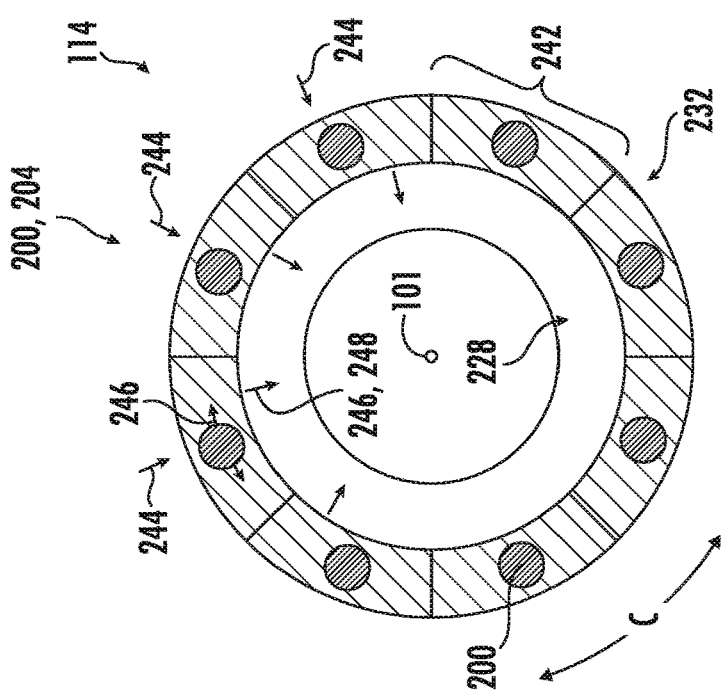
FIG. 3 is a schematic, axial view of the exemplary integrated fuel cell and combustor assembly of FIG. 2.

Additionally, or alternatively, in other exemplary embodiments, the first and second fuel cell stacks 232, 234 may be arranged along the circumferential direction of the combustion chamber 228 (see FIG. 3). Further, in other exemplary embodiments, the fuel cell assembly 204 may include any other suitable number and arrangement of fuel cell stacks to distribute output products at various locations along the axial and circumferential direction of the combustion chamber 228 having different parameters (e.g., temperatures, pressures, compositions, etc.).

Moreover, the exemplary fuel cell assembly 204 further includes a first power converter 236 and a second power converter 238. The first fuel cell stack 232 is in electrical communication with the first power converter 236 by a first plurality of power supply cables (not labeled), and the second fuel cell stack 234 is in electrical communication with the second power converter 238 by a second plurality of power supply cables (not labeled).

The first power converter 236 controls the electrical current drawn from the corresponding first fuel cell stack 232 and may convert the electrical power from a direct current ("DC") power to either DC power at another voltage level or alternating current ("AC") power. Similarly, the second power converter 238 controls the electrical current drawn from the second fuel cell stack 234 and may convert the electrical power from a DC power to either DC power at another voltage level or AC power. The first power converter 236, the second power converter 238, or both may be electrically coupled to an electric bus (such as the electric bus 326 described below).

The integrated fuel cell and combustor assembly 200 further includes a fuel cell controller 240 that is in operable communication with both of the first power converter 236 and second power converter 238 to, e.g., send and receive communications and signals therebetween. For example, the fuel cell controller 240 may send current or power setpoint signals to the first power converter 236 and second power converter 238, and may receive, e.g., a voltage or current feedback signal from the first power converter 236 and second power converter 238. The fuel cell controller 240 may be configured in the same manner as the controller 240 described below with reference to FIG. 5.

As will be discussed in more detail below, fuel cells are electro-chemical devices which can convert chemical energy from a fuel into electrical energy through an electro-chemical reaction of the fuel, such as hydrogen, with an oxidizer, such as oxygen contained in the atmospheric air. Fuel cell systems may advantageously be utilized as an energy supply system because fuel cell systems may be considered environmentally superior and highly efficient when compared to at least certain existing systems.

To improve system efficiency and fuel utilization and reduce external water usage, the fuel cell system may include an anode recirculation loop. As a single fuel cell can only generate about 1V voltage, a plurality of fuel cells may be stacked together (which may be referred to as a fuel cell stack) to generate a desired voltage. Fuel cells may include Solid Oxide Fuel Cells (SOFC), Molten Carbonate Fuel Cells (MCFC), Phosphoric Acid Fuel Cells (PAFC), and, Proton Exchange Membrane Fuel Cells (PEMFC), all generally named after their respective electrolytes.

It will be appreciated that in at least certain exemplary embodiments the first fuel cell stack 232, the second fuel cell stack 234, or both may extend substantially 360 degrees in a circumferential direction C of the gas turbine engine (i.e., a direction extending about the centerline axis 101 of the gas turbine engine 100). For example, referring now to FIG. 3, a simplified cross-sectional view of the integrated fuel cell and combustor assembly 200 is depicted according to an exemplary embodiment of the present disclosure. Although only the first fuel cell stack 232 is depicted in FIG. 3 for simplicity, the second fuel cell stack 234 may be configured in a similar manner.

As shown, the first fuel cell stack 232 extends around the combustion chamber 228 in the circumferential direction C, completely encircling the combustion chamber 228 around the centerline axis 101 in the embodiment shown. More specifically, the first fuel cell stack 232 includes a plurality of fuel cells 242 arranged along the circumferential direction C. The fuel cells 242 that are visible in FIG. 3 can be a single ring of fuel cells 242, with fuel cells 242 stacked together along the axial direction A (see FIG. 2) to form the first fuel cell stack 232. In another instance, multiple additional rings of fuel cells 242 can be placed on top of each other to form the first fuel cell stack 232 that is elongated along the centerline axis 101.

As will be explained in more detail, below, with reference to FIG. 5, the fuel cells 242 in the first fuel cell stack 232 are positioned to receive discharged air 244 from, e.g., the compressor section and fuel 246 from the fuel delivery system 146. The fuel cells 242 generate electrical current using this air 244 and at least some of this fuel 246, and radially direct partially oxidized fuel 246 and unused portion of air 248 into the combustion chamber 228 toward the centerline axis 101. The integrated fuel cell and combustor assembly 200 combusts the partially oxidized fuel 246 and air 248 in the combustion chamber 228 into combustion gasses that are directed downstream into the turbine section to drive or assist with driving the one or more turbines therein.

Figure 4:
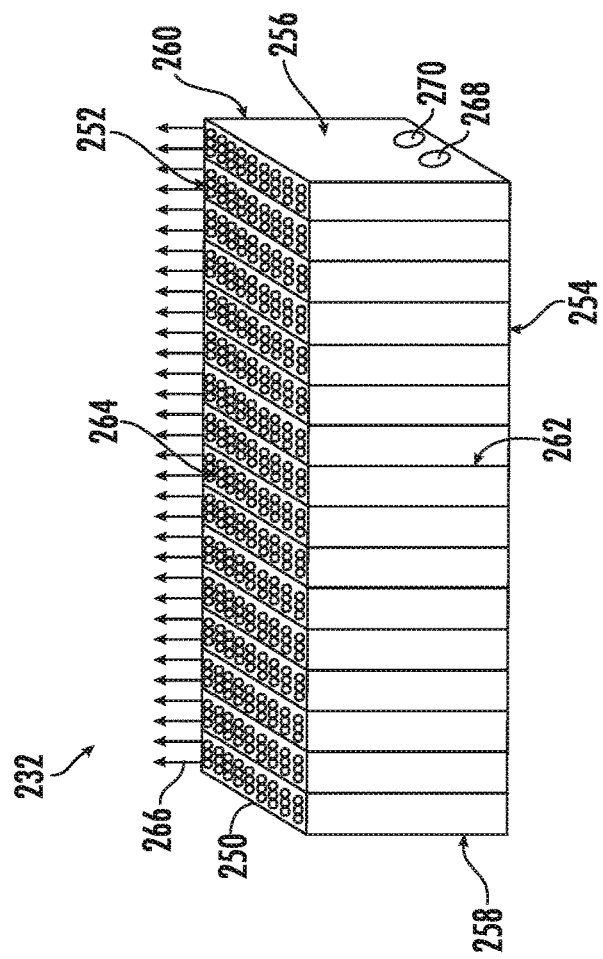
FIG. 4 is a schematic view of a fuel cell of a fuel cell assembly in accordance with an exemplary aspect of the present disclosure as may be incorporated into the exemplary integrated fuel cell and combustor assembly of FIG. 2.

Moreover, referring now to FIG. 4, a schematic illustration is provided as a perspective view of the first fuel cell stack 232 of the integrated fuel cell and combustor assembly 200 of FIG. 2. The second fuel cell stack 234 may be formed in a similar manner.

The first fuel cell stack 232 depicted includes a housing 250 having a combustion outlet side 252 and a side 254 that is opposite to the combustion outlet side 252, a fuel and air inlet side 256 and a side 258 that is opposite to the fuel and air inlet side 256, and sides 260, 262. The side 260, the side 258, and the side 254 are not visible in the perspective view of FIG. 4.

As will be appreciated, the first fuel cell stack 232 may include a plurality of fuel cells that are "stacked," e.g., side-by-side from one end of the first fuel cell stack 232

(e.g., fuel and air inlet side 256) to another end of the first fuel cell stack 232 (e.g., side 258). As such, it will further be appreciated that the combustion outlet side 252 includes a plurality of combustion outlets 264, each from a fuel cell of the first fuel cell stack 232. During operation, combustion gas 266 (also referred to herein as "output products") is directed from the combustion outlets 264 out of the housing 250. As described herein, the combustion gas 266 is generated using fuel and air that is not consumed by the fuel cells inside the housing 250 of the first fuel cell stack 232. The combustion gas 266 is provided to the combustion chamber 228 and burned during operation to generate combustion gasses used to generate thrust for the gas turbine engine 100 (and vehicle/aircraft incorporating the gas turbine engine 100).

The fuel and air inlet side 256 includes one or more fuel inlets 268 and one or more air inlets 270. Optionally, one or more of the inlets 268, 270 can be on another side of the housing 250. Each of the one or more fuel inlets 268 is fluidly coupled with a source of fuel for the first fuel cell stack 232, such as one or more pressurized containers of a hydrogen-containing gas or a fuel processing unit as described further below. Each of the one or more air inlets 270 is fluidly coupled with a source of air for the fuel cells, such as air that is discharged from a compressor section and/or an air processing unit as is also described further below. The one or more inlets 268, 270 separately receive the fuel and air from the external sources of fuel and air, and separately direct the fuel and air into the fuel cells.

In certain exemplary embodiments, the first fuel cell stack 232 of FIGS. 2 through 4 may be configured in a similar manner to one or more of the exemplary fuel cell systems (labeled 100) described in, e.g., U.S. Patent Application Publication No. 2020/0194799 A1, filed Dec. 17, 2018, that is incorporated by reference herein in its entirety. It will further be appreciated that the second fuel cell stack 234 of FIG. 2 may be configured in a similar manner as the first fuel cell stack 232, or alternatively may be configured in any other suitable manner.

Figure 5:
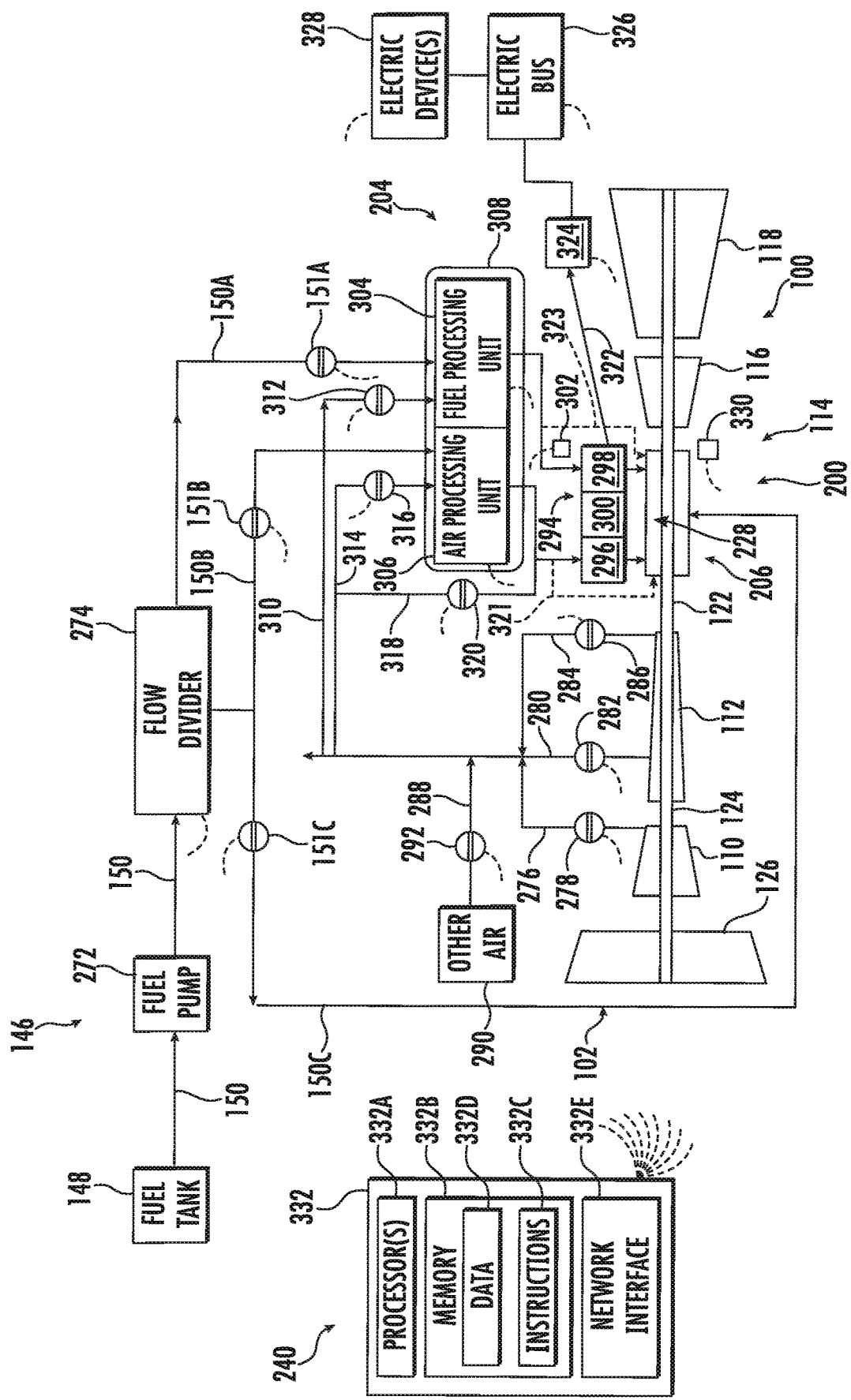
FIG. 5 is a schematic diagram of a gas turbine engine including an integrated fuel cell and combustor assembly in accordance with an exemplary aspect of the present disclosure.

Referring now to FIG. 5, operation of an integrated fuel cell and combustor assembly 200 (e.g., a fuel cell assembly) in accordance with an exemplary embodiment of the present disclosure will be described. More specifically, FIG. 5 provides a schematic illustration of a gas turbine engine 100 and an integrated fuel cell and combustor assembly 200 according to an embodiment of the present disclosure. The gas turbine engine 100 and integrated fuel cell and combustor assembly 200 may, in certain exemplary embodiments, be configured in a similar manner as one or more of the exemplary embodiments of FIGS. 1 through 4.

Accordingly, it will be appreciated that the gas turbine engine 100 generally includes a fan section 102 having a fan 126, an LP compressor 110, an HP compressor 112, a combustion section 114, an HP turbine 116, and an LP turbine 118. The combustion section 114 generally includes the integrated fuel cell and combustor assembly 200 having a combustor 206 and a fuel cell assembly 204.

A propulsion system including the gas turbine engine 100 further includes a fuel delivery system 146. The fuel delivery system 146 generally includes a fuel source 148 and one or more fuel delivery lines 150. The fuel source 148 may include a supply of fuel (e.g., a hydrocarbon fuel, including, e.g., a carbon-neutral fuel or synthetic hydrocarbons) for the gas turbine engine 100. In addition, it will be appreciated that the fuel delivery system 146 also includes a fuel pump 272 and a flow divider 274, and the one or more fuel delivery lines 150 include a first fuel delivery line 150A, a second fuel delivery line 150B, and a third fuel delivery line 150C.

The flow divider 274 divides the fuel flow from the fuel source 148 and fuel pump 272 into a first fuel flow through the first fuel delivery line 150A to the fuel cell assembly 204, a second fuel flow through the second fuel delivery line 150B also to the fuel cell assembly 204 (and in particular to an air processing unit, described below), and a third fuel flow through a third fuel delivery line 150C to the combustor 206. The flow divider 274 may include a series of valves (not shown) to facilitate such dividing of the fuel flow from the fuel source 148, or alternatively may be of a fixed geometry. Additionally, for the embodiment shown, the fuel delivery system 146 includes a first fuel valve 151A associated with the first fuel delivery line 150A (e.g., for controlling the first fuel flow), a second fuel valve 151B associated with the second fuel delivery line 150B (e.g., for controlling the second fuel flow), and a third fuel valve 151C associated with the third fuel delivery line 150C (e.g., for controlling the third fuel flow).

The gas turbine engine 100 further includes a compressor bleed system and an airflow delivery system. More specifically, the compressor bleed system includes an LP bleed air duct 276 and an associated LP bleed air valve 278, an HP bleed air duct 280 and an associated HP bleed air valve 282, an HP exit air duct 284 and an associated HP exit air valve 286.

The gas turbine engine 100 further includes an air stream supply duct 288 (in airflow communication with an airflow supply 290) and an associated air valve 292, which is also in airflow communication with the airflow delivery system for providing compressed airflow to the fuel cell assembly 204 of the integrated fuel cell and combustor assembly 200. The airflow supply may be, e.g., a second gas turbine engine configured to provide a cross-bleed air, an auxiliary power unit (APU) configured to provide a bleed air, a ram air turbine (RAT), etc. The airflow supply may be complimentary to the compressor bleed system if the compressor air source is inadequate or unavailable.

The compressor bleed system (and air stream supply duct 288) is in airflow communication with airflow delivery system for providing compressed airflow to the fuel cell assembly 204, as will be explained in more detail below.

Referring still to FIG. 5, the fuel cell assembly 204 of the integrated fuel cell and combustor assembly 200 includes a fuel cell stack 294, which may be configured in a similar manner as, e.g., the first fuel cell stack 232 described above. The fuel cell stack 294 is depicted schematically as a single fuel cell having a cathode side 296, an anode side 298, and an electrolyte 300 positioned therebetween. As will generally be appreciated, the electrolyte 300 may, during operation, conduct negative oxygen ions from the cathode side 296 to the anode side 298 to generate an electric current and electric power.

The anode side 298 may support electrochemical reactions that generate electricity. A fuel may be oxidized in the anode side 298 with oxygen ions received from the cathode side 296 via diffusion through the electrolyte 300. The reactions may create heat, steam, and electricity in the form of free electrons in the anode side 298, which may be used to supply power to an energy consuming device (such as the one or more additional electric devices 328 described below). The oxygen ions may be created via an oxygen reduction of a cathode oxidant using the electrons returning from the energy consuming device into the cathode side 296.

The cathode side 296 may be coupled to a source of the cathode oxidant, such as oxygen in the atmospheric air. The cathode oxidant is defined as the oxidant that is supplied to the cathode side 296 employed by the fuel cell system in generating electrical power. The cathode side 296 may be permeable to the oxygen ions received from the cathode oxidant.

The electrolyte 300 may be in communication with the anode side 298 and the cathode side 296. The electrolyte 300 may pass the oxygen ions from the cathode side 296 to the anode side 298, and may have little or no electrical conductivity, so as to prevent passage of the free electrons from the cathode side 296 to the anode side 298.

The anode side of a solid oxide fuel cell (such as the fuel cell stack 294) may be composed of a nickel/yttria-stabilized zirconia (Ni/YSZ) cermet. Nickel in the anode side serves as a catalyst for fuel oxidation and current conductor. During normal operation of the fuel cell stack 294, the operating temperature may be greater than or equal to about 700° C., and the nickel (Ni) in the anode remains in its reduced form due to the continuous supply of primarily hydrogen fuel gas.

Briefly, it will be appreciated that the fuel cell assembly 204 further includes a fuel cell sensor 302 configured to sense data indicative of a fuel cell assembly operating parameter, such as a temperature of the fuel cell stack 294 (e.g., of the cathode side 296 or anode side 298 of the fuel cell), a pressure within the fuel cell stack 294 (e.g., of within the cathode side 296 or anode side 298 of the fuel cell).

The fuel cell stack 294 is disposed downstream of the LP compressor 110, the HP compressor 112, or both. Further, as will be appreciated from the description above with respect to FIG. 2, the fuel cell stack 294 may be coupled to or otherwise integrated with a liner of the combustor 206 (e.g., an inner liner 208 or an outer liner 210). In such a manner, the fuel cell stack 294 may also be arranged upstream of a combustion chamber 228 of the integrated fuel cell and combustor assembly 200, and further upstream of the HP turbine 116 and LP turbine 118.

As shown in FIG. 5, the fuel cell assembly 204 also includes a fuel processing unit 304 and an air processing unit 306. In the exemplary embodiment depicted, the fuel processing unit 304 and air processing unit 306 are manifolded together within a housing 308 to provide conditioned air and fuel to the fuel cell stack 294.

The fuel processing unit 304 may be any suitable structure for generating a hydrogen rich fuel stream. For example, the fuel processing unit 304 may include a fuel reformer or a catalytic partial oxidation convertor ($CPO_x$) for developing the hydrogen rich fuel stream for the fuel cell stack 294.

It should be appreciated, however, that the fuel processing unit 304 may additionally or alternatively include any suitable type of fuel reformer, such as an autothermal reformer and steam reformer that may need an additional stream of steam inlet with higher hydrogen composition at the reformer outlet stream. Additionally, or alternatively, still, the fuel processing unit 304 may include a reformer integrated with the fuel cell stack 294.

The air processing unit 306 may be any suitable structure for raising the temperature of air that is provided thereto to a temperature high enough to enable fuel cell temperature control (e.g., about 600° C. to about 800° C.). For example, in the embodiment depicted, the air processing unit includes a preburner system, operating based on a fuel flow through the second fuel delivery line 150B, configured for raising the temperature of the air through combustion, e.g., during transient conditions such as startup, shutdown and abnormal situations.

Similarly, it should be appreciated that the air processing unit 306 of FIG. 5 could alternatively be a heat exchanger or another device for raising the temperature of the air provided thereto to a temperature high enough to enable fuel cell temperature control (e.g., about 600° C. to about 800° C.).

As mentioned above, the compressor bleed system (and air stream supply duct 288) is in airflow communication with airflow delivery system for providing compressed airflow to the fuel cell assembly 204. The airflow delivery system includes an anode airflow duct 310 and an associated anode airflow valve 312 for providing an airflow to the fuel processing unit 304, a cathode airflow duct 314 and associated cathode airflow valve 316 for providing an airflow to the air processing unit 306, and a cathode bypass air duct 318 and an associated cathode bypass air valve 320 for providing an airflow directly to the fuel cell stack 294 (or rather to the cathode side 296 of the fuel cell(s)). The fuel delivery system 146 is configured to provide the first flow of fuel through the first fuel delivery line 150A to the fuel processing unit 304, and the second flow of fuel through the second fuel delivery line 150B to the air processing unit 306 (e.g., as fuel for a preburner system, if provided).

The fuel cell stack 294 outputs the power produced as a fuel cell power output 322. Further, the fuel cell stack 294 directs a cathode air discharge and an anode fuel discharge (neither labeled for clarity purposes) into the combustion chamber 228 of the combustor 206.

In operation, the air processing unit 306 is configured to heat/cool a portion of the compressed air, incoming through the cathode airflow duct 314, to generate a processed air to be directed into the fuel cell stack 294 to facilitate the functioning of the fuel cell stack 294. The air processing unit 306 receives the second flow of fuel from the second fuel delivery line 150B and may, e.g., combust such second flow of fuel to heat the air received to a desired temperature (e.g., about 600° C. to about 800° C.) to facilitate the functioning of the fuel cell stack 294. The air processed by the air processing unit 306 is directed into the fuel cell stack 294. In an embodiment of the disclosure, as is depicted, the cathode bypass air duct 318 and the air processed by the air processing unit 306 may combine into a combined air stream to be fed into the cathode 296 of the fuel cell stack 294.

Further, as shown in the embodiment of FIG. 5, the first flow of fuel through the first fuel delivery line 150A is directed to the fuel processing unit 304 for developing a hydrogen rich fuel stream (e.g., optimizing a hydrogen content of a fuel stream), to also be fed into the fuel cell stack 294. As will be appreciated, and as discussed below, the flow of air (processed air and bypass air) to the fuel cell stack 294 (e.g., the cathode side 296) and fuel from the fuel processing unit 304 to the fuel cell stack 294 (e.g., the anode side 298) may facilitate electrical power generation.

Because the inlet air for the fuel cell stack 294 may come solely from the upstream compressor section without any other separately controlled air source, it will be appreciated that the inlet air for the fuel cell stack 294 discharged from the compressor section is subject to the air temperature changes that occur at different flight stages. By way of illustrative example only, the air within a particular location in the compressor section of the gas turbine engine 100 may work at 200° C. during idle, 600° C. during take-off, 268° C. during cruise, etc. This type of temperature change to the inlet air directed to the fuel cell stack 294 may lead to significant thermal transient issues (or even thermal shock) to the ceramic materials of the fuel cell stack 294, which could range from cracking to failure.

Thus, by fluidly connecting the air processing unit 306 between the compressor section and the fuel cell stack 294, the air processing unit 306 may serve as a control device or system to maintain the air processed by the air processing unit 306 and directed into the fuel cell stack 294 within a desired operating temperature range (e.g., plus or minus 100° C., or preferably plus or minus 50° C., or plus or minus 20° C.). In operation, the temperature of the air that is provided to the fuel cell stack 294 can be controlled (relative to a temperature of the air discharged from the compressor section) by controlling the flow of fuel to the air processing unit 306. By increasing a fuel flow to the air processing unit 306, a temperature of the airflow to the fuel cell stack 294 may be increased. By decreasing the fuel flow to the air processing unit 306, a temperature of the airflow to the fuel cell stack 294 may be decreased. Optionally, no fuel can be delivered to the air processing unit 306 to prevent the air processing unit 306 from increasing and/or decreasing the temperature of the air that is discharged from the compressor section and directed into the air processing unit 306.

Moreover, as is depicted in phantom, the fuel cell assembly 204 further includes an airflow bypass duct 321 extending around the fuel cell stack 294 to allow a portion or all of an airflow conditioned by the air processing unit 306 (and combined with any bypass air through duct 318) to bypass the cathode side 296 of the fuel cell stack 294 and go directly to the combustion chamber 228. The airflow bypass duct 321 may be in thermal communication with the fuel cell stack 294. The fuel cell assembly further includes a fuel bypass duct 323 extending around the fuel cell stack 294 to allow a portion or all of a reformed fuel from the fuel processing unit 304 to bypass the anode side 298 of the fuel cell stack 294 and go directly to the combustion chamber 228.

As briefly mentioned above, the fuel cell stack 294 converts the anode fuel stream from the fuel processing unit 304 and air processed by the air processing unit 306 sent into the fuel cell stack 294 into electrical energy, the fuel cell power output 322, in the form of DC current. This fuel cell power output 322 is directed to a power convertor 324 in order to change the DC current into DC current or AC current that can be effectively utilized by one or more subsystems. In particular, for the embodiment depicted, the electrical power is provided from the power converter to an electric bus 326. The electric bus 326 may be an electric bus dedicated to the gas turbine engine 100, an electric bus of an aircraft incorporating the gas turbine engine 100, or a combination thereof. The electric bus 326 is in electric communication with one or more additional electrical devices 328, which may be adapted to draw an electric current from, or apply an electrical load to, the fuel cell stack 294. The one or more additional electrical devices 328 may be a power source, a power sink, or both. For example, the additional electrical devices 328 may be a power storage device (such as one or more batteries), an electric machine (an electric generator, an electric motor, or both), an electric propulsion device, etc. For example, the one or more additional electric devices 328 may include the starter motor/generator of the gas turbine engine 100.

Referring still to FIG. 5, the gas turbine engine 100 further includes a sensor 330. In the embodiment shown, the sensor 330 is configured to sense data indicative of a flame within the combustion section 114 of the gas turbine engine 100. The sensor 330 may be, for example, a temperature sensor configured to sense data indicative of an exit temperature of the combustion section 114, an inlet temperature of the turbine section, an exhaust gas temperature, or a combination thereof. Additionally, or alternatively, the sensor 330 may be any other suitable sensor, or any suitable combination of sensors, configured to sense one or more gas turbine engine operating conditions or parameters, including data indicative of a flame within the combustion section 114 of the gas turbine engine 100.

Moreover, as is further depicted schematically in FIG. 5, the propulsion system, an aircraft including the propulsion system, or both, includes a controller 240. For example, the controller 240 may be a standalone controller, a gas turbine engine controller (e.g., a full authority digital engine control, or FADEC, controller), an aircraft controller, supervisory controller for a propulsion system, a combination thereof, etc.

The controller 240 is operably connected to the various sensors, valves, etc. within at least one of the gas turbine engine 100, the fuel delivery system 146, and the fuel cell and combustor assembly 200. More specifically, for the exemplary aspect depicted, the controller 240 is operably connected to the air processing unit 306, the fuel processing unit 304, the power converter 324 (and/or power converters 236m 238), the valves (e.g., valves 235A, 235B) of axially distributed fuel cell stacks (e.g., fuel cell stacks 234A, 234B), the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302.

As will be appreciated from the description below, the controller 240 may be in wired or wireless communication with these components. In this manner, the controller 240 may receive data from a variety of inputs (including a supervisory controller 412 shown in FIG. 6, the gas turbine engine sensor 330 and the fuel cell sensor 302), may make control decisions, and may provide data (e.g., instructions) to a variety of output (including the valves of the compressor bleed system to control an airflow bleed from the compressor section, the airflow delivery system to direct the airflow bled from the compressor section, and the fuel delivery system 146 to direct the fuel flow within the gas turbine engine 100).

Referring particularly to the operation of the controller 240, in at least certain embodiments, the controller 240 can include one or more computing device(s) 332. The computing device(s) 332 can include one or more processor(s) 332A and one or more memory device(s) 332B. The one or more processor(s) 332A can include any suitable processing device, such as a microprocessor, microcontroller, integrated circuit, logic device, and/or other suitable processing device. The one or more memory device(s) 332B can include one or more computer-readable media, including, but not limited to, non-transitory computer-readable media, RAM, ROM, hard drives, flash drives, and/or other memory devices.

The one or more memory device(s) 332B can store information accessible by the one or more processor(s) 332A, including computer-readable instructions 332C that can be executed by the one or more processor(s) 332A. The instructions 332C can be any set of instructions that when executed by the one or more processor(s) 332A, cause the one or more processor(s) 332A to perform operations. In some embodiments, the instructions 332C can be executed by the one or more processor(s) 332A to cause the one or more processor(s) 332A to perform operations, such as any of the operations and functions for which the controller 240 and/or the computing device(s) 332 are configured, the operations for operating a propulsion system (e.g., method 600), as described herein, and/or any other operations or functions of the one or more computing device(s) 332. The instructions 332C can be software written in any suitable programming language or can be implemented in hardware.

Additionally, and/or alternatively, the instructions 332C can be executed in logically and/or virtually separate threads on processor(s) 332A. The memory device(s) 332B can further store data 332D that can be accessed by the processor(s) 332A. For example, the data 332D can include data indicative of power flows, data indicative of gas turbine engine 100/aircraft operating conditions, and/or any other data and/or information described herein.

The computing device(s) 332 also includes a network interface 332E configured to communicate, for example, with the other components of the gas turbine engine 100 (such as the valves of the compressor bleed system (valves 278, 282, 286), the airflow delivery system (valves 312, 316, 320), and the fuel delivery system 146 (flow divider 274, valves 151A, 151B, 151C), as well as the sensor 330 of the gas turbine engine 100 and the fuel cell sensor 302), the aircraft incorporating the gas turbine engine 100, etc. The network interface 332E can include any suitable components for interfacing with one or more network(s), including for example, transmitters, receivers, ports, controllers, antennas, and/or other suitable components. In such a manner, it will be appreciated that the network interface 332E may utilize any suitable combination of wired and wireless communications network(s).

The technology discussed herein makes reference to computer-based systems and actions taken by and information sent to and from computer-based systems. It will be appreciated that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 6:
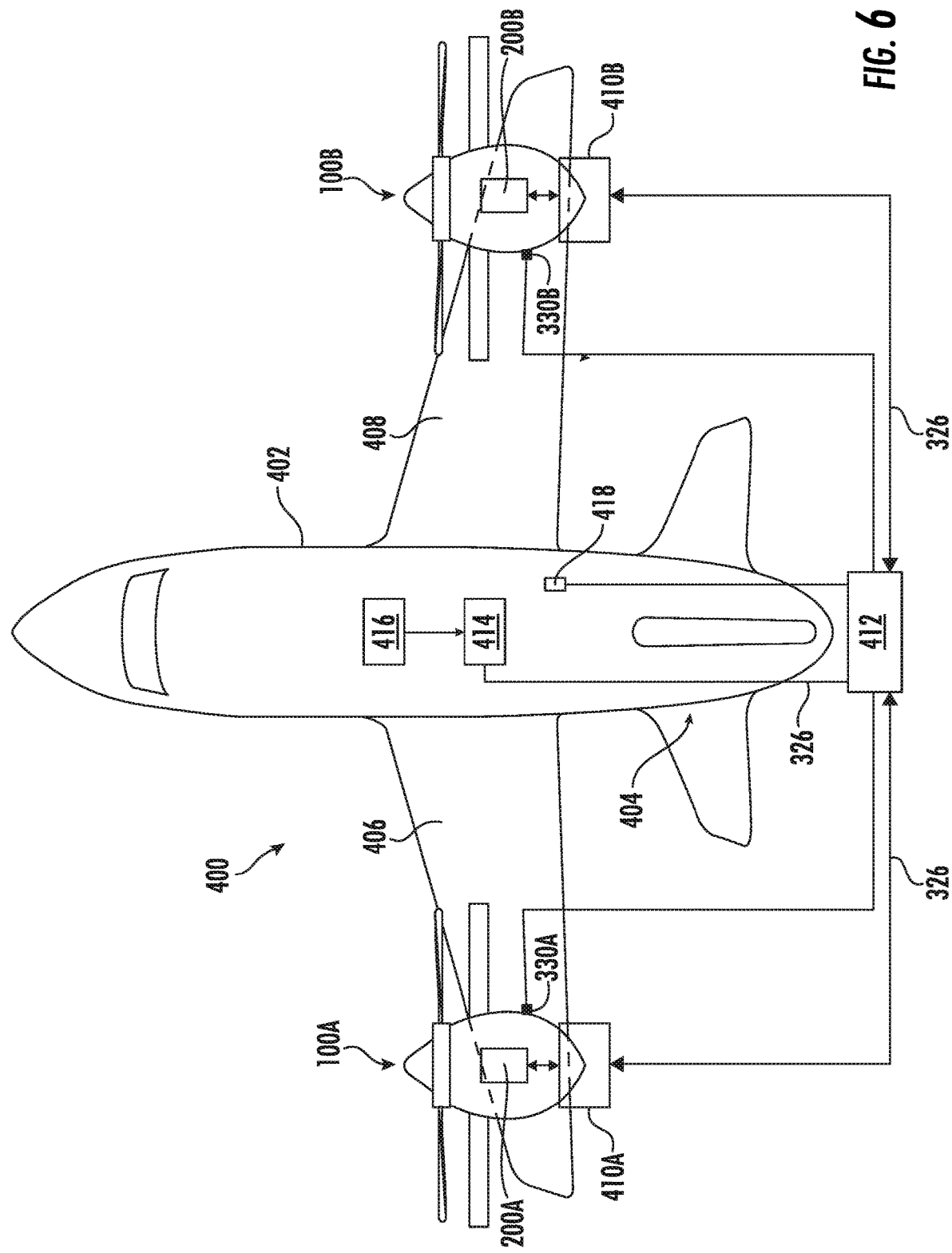
FIG. 6 is a schematic view of a vehicle and propulsion system in accordance with an exemplary aspect of the present disclosure.

As briefly mentioned above, the fuel cell assembly 204 may be in electrical communication with the electric bus 326, which may be an electric bus of the gas turbine engine 100, of an aircraft, or a combination thereof. Referring now briefly to FIG. 6, a schematic view is provided of an aircraft 400 in accordance with an embodiment of the present disclosure including one or more gas turbine engines 100 (labeled 100A and 100B), each with an integrated fuel cell and combustor assembly 200 (labeled 200A and 200B), and an aircraft electric bus 326 in electrical communication with the one or more gas turbine engines 100.

In particular, for the exemplary embodiment depicted, the aircraft 400 is provided including a fuselage 402, an empennage 404, a first wing 406, a second wing 408, and a propulsion system. The propulsion system generally includes a first gas turbine engine 100A coupled to, or integrated with, the first wing 406 and a second gas turbine engine 100B coupled to, or integrated with, the second wing 408. It will be appreciated, however, that in other embodiments, any other suitable number and or configuration of gas turbine engines 100 may be provided (e.g., fuselage-mounted, empennage-mounted, etc.).

The first gas turbine engine 100A generally includes a first integrated fuel cell and combustor assembly 200A and a first electric machine 410A. The first integrated fuel cell and combustor assembly 200A may generally include a first fuel cell assembly. The first electric machine 410A may be an embedded electric machine, an offset electric machine (e.g., rotatable with the gas turbine engine 100 through an accessory gearbox or suitable geartrain), etc. For example, in certain exemplary embodiments, the first electric machine 410A may be a starter motor/generator for the first gas turbine engine 100A.

Similarly, the second gas turbine engine 100B generally includes a second integrated fuel cell and combustor assembly 200B and a second electric machine 410B. The second integrated fuel cell and combustor assembly 200B may generally include a second fuel cell assembly. The second electric machine 410B may also be an embedded electric machine, an offset electric machine (e.g., rotatable with the gas turbine engine 100 through an accessory gearbox or suitable geartrain), etc. For example, in certain exemplary embodiments, the second electric machine 410B may be a starter motor/generator for the second gas turbine engine 100B.

In the embodiment of FIG. 6, the aircraft 400 additionally includes the electric bus 326 and a supervisory controller 412. Further, it will be appreciated that the aircraft 400 and/or propulsion system includes one or more electric devices 414 and an electric energy storage unit 416, each in electric communication with the electric bus 326. The electric devices 414 may represent one or more aircraft power loads (e.g., avionics systems, control systems, electric propulsors, etc.), one or more electric power sources (e.g., an auxiliary power unit), etc. The electric energy storage unit 416 may be, e.g., a battery pack or the like for storing electric power.

The electric bus 326 further electrically connects to the first electric machine 410A and first fuel cell assembly, as well as to the second electric machine 410B and second fuel cell assembly. The supervisory controller 412 may be configured in a similar manner as the controller 240 of FIG. 5 or may be in operative communication with a first gas turbine engine controller dedicated to the first gas turbine engine 100A and a second gas turbine engine controller dedicated to the second gas turbine engine 100B.

In such a manner, it will be appreciated that the supervisory controller 412 may be configured to receive data from a gas turbine engine sensor 330A of the first gas turbine engine 100A and from a gas turbine engine sensor 330B of the second gas turbine engine 100B, and may further be configured to send data (e.g., commands) to various control elements (such as valves) of the first and second gas turbine engines 100A, 100B.

Moreover, it will be appreciated that for the embodiment depicted, the aircraft 400 includes one or more aircraft sensor(s) 418 configured to sense data indicative of various flight operations of the aircraft 400, including, e.g., altitude, ambient temperature, ambient pressure, airflow speed, etc. The supervisory controller 412 is operably connected to these aircraft sensor(s) 418 to receive data from such aircraft sensor(s) 418.

In addition to receiving data from sensors 330A, 330B, 418 and sending data to control elements, the supervisory controller 412 is configured to control a flow of electric power through the electric bus 326. For example, the supervisory controller 412 may be configured to command and receive a desired power extraction from one or more of the electric machines (e.g., the first electric machine 410A and second electric machine 410B), one or more of the fuel cell assemblies (e.g., the first fuel cell assembly and second fuel cell assembly), or both, and provide all or a portion of the extracted electric power to other of the one or more of the electric machines (e.g., the first electric machine 410A and second electric machine 410B), one or more of the fuel cell assemblies (e.g., the first fuel cell assembly and second fuel cell assembly), or both. One or more of these actions may be taken in accordance with the logic outlined below.

Temperature of the combustion zone is an important factor influencing pollutant emissions from gas turbine combustors. With conventional combustors, the temperature of the combustion zone can range from 1000 K at low-power operation to 2500 K at high-power operation, as indicated in FIG. 7.

Figure 7:
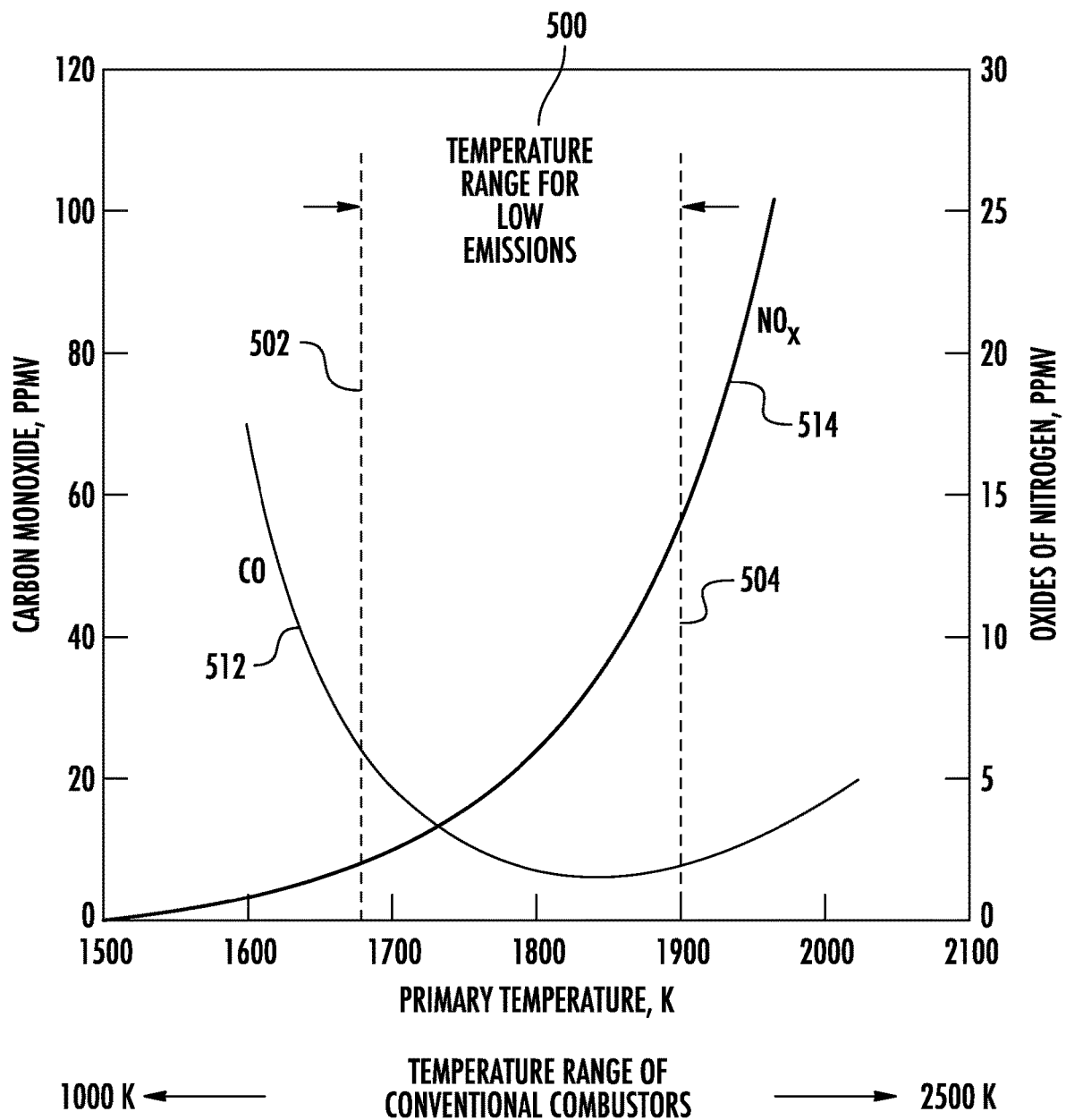
FIG. 7 is a chart depicting a relationship between carbon monoxide emissions and emissions of nitrogen oxides with respect to combustor temperature in an exemplary combustor in accordance with an exemplary aspect of the present disclosure.

FIG. 7 also shows that too much CO is formed at temperatures below around 1670 K, whereas excessive amounts of $NO_x$ are produced at temperatures higher than around 1900 K. The levels of CO and $NO_x$ are below 25 and 15 ppmv, respectively, in the band of temperatures between 1670 and 1900 K. The low emissions combustors described below maintain the combustion zone (or zones) within a low emissions band of temperatures, for example, over the entire power range of the engine.

Referring still to FIG. 7, carbon monoxide (CO) emissions and emissions of nitrogen oxides ($NO_x$) of an engine with respect to a combustor temperature are illustrated in a chart. In particular, the chart of FIG. 7 depicts a combustor temperature on an x-axis, a CO content in parts per million volume ("ppmv") on a first y-axis (on the left in FIG. 7, and a $NO_x$ content in ppmv on a second y-axis (on the right in FIG. 7). The CO and $NO_x$ contents may refer to the CO and $NO_x$ content in a combustor exhaust. As used herein, combustor temperature may refer to primary temperature, bulk temperature, peak temperature, flame temperature, and the like.

As described in further detail below, the gas turbine engine 100 and/or the integrated fuel cell and combustor assembly 200 is controlled to operate with a combustor temperature in the combustor 206 in a range of temperatures 500 for low emissions (e.g., an emissions range). The range of temperatures 500 for low emissions is defined by a lower limit 502 and an upper limit 504. Below the lower limit 502, carbon monoxide (CO) 512 increases beyond a desired threshold. Above the upper limit, nitrogen oxide ($NO_x$) 514 increases beyond a desired threshold.

Formation of CO 512 below the lower limit 502 may be due to inadequate burning rates in the combustor 206. For example, the air to fuel ratio in the combustor 206 may be too low or there may be insufficient residence time.

Formation of CO 512 below the lower limit 502 may also be due to inadequate mixing of fuel and air. Here, in some regions of the combustor 206, the mixture of fuel and air may be too weak to support combustion and, in other regions of the combustor 206, the mixture of fuel and air may lead to over-rich combustion that yields high local concentrations of CO 512.

Formation of CO 512 below the lower limit 502 may also be due to quenching of products before completion of combustion in the combustor 206.

Formation of CO 512 is influenced by the equivalence ratio (e.g., the fuel to air ratio), which relates to the flame temperature. In FIG. 7, below the lower limit 502, the CO 512 increases at lower combustor temperatures, for example, due to an equivalence ratio that is too high (rich). The increase in CO 512 may be due to the slow rates of oxidation associated with a low combustion temperature.

In the exemplary aspect depicted, at a temperature above, e.g., 1800 Kelvin, the production of CO 512 by chemical dissociation of carbon dioxide ($CO_2$) starts to become significant, which increases the level of CO 512.

Formation of $NO_x$ 514 may increase strongly with the firing temperature; may increase exponentially with an inlet air temperature of the combustor 206; may increase with the square root of inlet pressure of the combustor 206; and may increase with increasing residence time in the flame zone of the combustor 206.

It will be appreciated, however, that the values provided in the chart of FIG. 7 are provided by way of example only to illustrate the concepts of the present disclosure. Actual values of CO and $NO_x$ emissions for a particular engine and combustor configuration may be dependent on a variety of additional factors not described here.

Figures 8, 9:
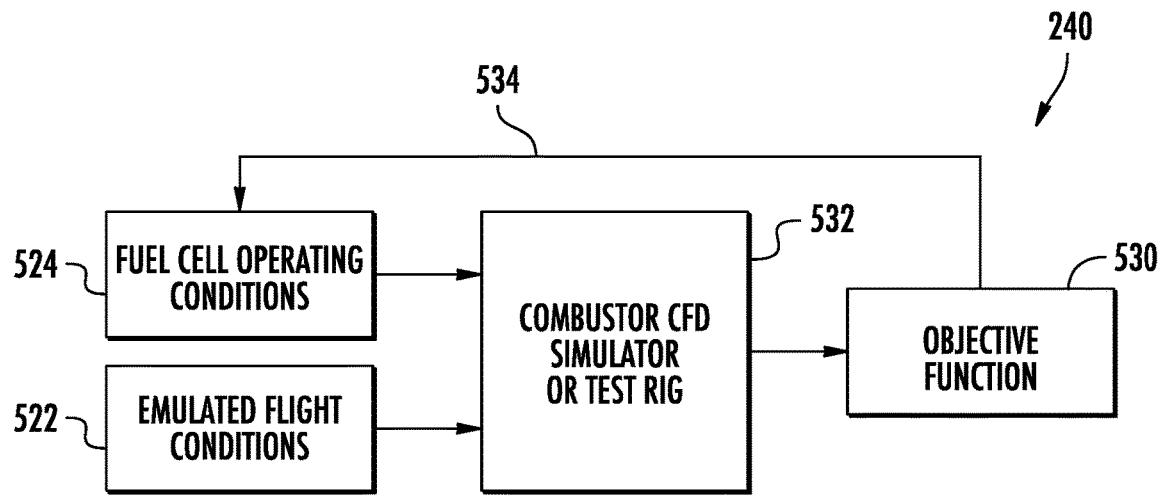
FIG. 8 is a flow diagram of the controller of the vehicle and propulsion system of FIG. 5 in accordance with an exemplary aspect of the present disclosure.
FIG. 9 is a table of the controller of FIG. 8 in accordance with an exemplary aspect of the present disclosure.

Referring to FIG. 8, a schematic view of an offline tuning aspect of the controller 240 is provided. The exemplary offline tuning aspect of the controller 240 may include determining sets of fuel cell operating conditions 524. Each determined set of fuel cell operating conditions 524 corresponds to one of a plurality of objective functions 530 and one of a plurality of sets of system operation conditions 522, for example, as shown in a table in FIG. 9.

For purposes of teaching, a system described herein includes the gas turbine engine 100 and the system operation conditions 522 are described as emulated flight conditions 522. However, in other embodiments (e.g., land-based or water-based vehicles, etc.), include control inputs, operating conditions, parameters, and performance of the associated system or conditions of the environment around the system.

The emulated flight conditions 522 may include altitude, Mach number, ambient conditions (e.g., temperature), conditions or inputs associated with control or performance of the engine 100, and conditions or inputs associated with a flight mode (e.g., such as takeoff, ramping, cruise, descent, ground idle, flight idle, etc.). Values for the emulated flight conditions 522 may be modeled, previously measured, and/or determined based on historical flight data and expected future flight scenarios.

The fuel cell operating conditions 524 may include control inputs, operating conditions, parameters, and performance of the integrated fuel cell and combustor assembly 200 and/or the fuel cell stacks 232, 234 (FIG. 2). As described below, the fuel cell operating conditions 524 may include the fuel cell temperature (T_fc), the hydrogen conversion rate ($CPO_x(H_2)$), and the fuel utilization (Uf), and the power (Pelec) drawn from the fuel cell stack 294. In addition, the fuel cell operating conditions 524 may include the flow of main fuel to the combustor 206, the flow of fuel to the fuel cell stacks 234A, 234B, etc.

In some embodiments, the fuel cell operating conditions 524 may include other variable aspects of the system that are not directly associated with control, operation, or performance of the integrated fuel cell and combustor assembly 200 and/or the fuel cell stacks 232, 234 but that are variable and contribute to an optimal, best, preferred, etc. value of the objective function 530. Such fuel cell operating conditions 524 may include variable geometries such as inlet guide vanes (IGV), variable guide vanes (VGV), and combustor equivalence ratio, combinations thereof, and the like.

More generally, in some embodiments, the emulated flight conditions 522 may be known, fixed, selected, measured, etc. operations or conditions and the fuel cell operating conditions 524 may include variable operations or conditions (e.g., including those associated with the with control, operation, or performance of the integrated fuel cell and combustor assembly 200 and/or the fuel cell stacks 232, 234).

The objective function 530 may include one or more terms that represent desired performance and/or emissions. For example, the objective function 530 may include terms including performance (e.g., thrust demand, power off-take demand), emissions (e.g., an emission regulation limit), thrust-specific fuel consumption (TSFC), combinations thereof, and the like.

Thrust-specific fuel consumption (TSFC) is the fuel efficiency of an engine design with respect to thrust output. TSFC may be fuel consumption (grams/second) per unit of thrust (kilonewtons, or kN). TSFC is thrust-specific in that the fuel consumption is divided by the thrust.

The objective function 530 may include a combination of terms of performance and emissions. For example, the objective function 530 may include thrust demand with an emission regulation limit, thrust and power offtake demand with emission regulation limit, lowest TSFC with emission regulation limit, etc. Weighting coefficients may be used to prioritize the importance of each term, as well as the penalty for violating certain terms.

As an example, the objective function 530 may include terms representing lowest TSFC and an emission regulation limit. Here, the objective function 530 may be formulated as a minimization problem. The objective function 530 may be given as:

$$a*TSFC+b*(E-E\text{-Limit})$$

where TSFC is thrust specific fuel consumption, E is an actual emission value (such as CO % and $NO_x$ %), E-Limit is a regulation limit (e.g., 118 gram per kilo-newton (g/kN) for CO). In this formulation, the objective function 530 includes a first term (TSFC) that represents the performance (e.g., thrust and fuel efficiency) and a second term (E–E-Limit) that represents emissions (e.g., the degree of violation of an emissions regulation).

The coefficients "a" and "b" may be used to weight the relative costs of the first term and the second term. For example, the coefficient "a" may be set as one, and the coefficient "b" may set as a large positive number (e.g., a value of b=1000). Here, the large value of "b" results in a high cost penalty for any violation of the emission regulation limit (E-Limit).

An engine or system simulator such as computational fluid dynamics (CFD) simulator 532 or test rig can be used to relate the emulated flight conditions 522 and the fuel cell operating conditions 524 to the terms of the objective function 530. The emulated flight conditions 522 and the fuel cell operating conditions 524 may be related to the terms of the objective function 530 by solid oxide fuel cell (SOFC) models, engine models, limit control logics, prioritization logics, combinations thereof, and the like. For example, the simulator 532 may include the models or logics described in further detail below.

For example, thrust may be determined from combustor power; combustor power may be determined from mass flowrates for the main fuel and of the fuel cell, and low heat values for the main fuel and fuel cell; and a low heat value for the fuel cell may be determined based on electric power drawn from the fuel cell, hydrogen conversion rate, fuel utilization, a temperature of the fuel cell.

Combustor power (Pcomb) can be represented as:

$$P\text{comb}=W36*LHV\_36+Wfc*LHV\_fc$$

where W36 is a mass flow rate of the main fuel into the combustor through the main inlet (e.g., mass flowrate of the fuel through the third fuel delivery line 150C to the combustor in FIG. 5), LHV_36 is a low heat value of the main fuel, Wfc is a mass flow rate through the fuel cell stack(s) 294 (defined further, below), and LHV_fc is a low heat value of the fuel cell stack 294 (defined further below).

The mass flow rate (Wfc) through the fuel cell stack 294 can be represented as:

$$Wfc=WA\_fc+WF\_fc$$

where WA_fc is the air flow rate (e.g., from the air processing unit 306) and WF_fc is the fuel flow rate (e.g., from the fuel processing unit 304).

The low heat value of the fuel cell (LHV_fc) may be a function of a plurality of fuel cell operating conditions 524, and more specifically can be represented as:

$$LHV\_fc=f(Pelec,CPO_x(H_2),Uf,T\_fc)$$

where Pelec is the power drawn from the fuel cell, $CPO_x(H_2)$ is the hydrogen conversion rate (e.g., conversion of fuel to hydrogen-rich fuel by the fuel reformer or the fuel processing unit 304), Uf is the fuel utilization (e.g., how much hydrogen is consumed in the fuel cell, reflects the reaction rate of hydrogen, e.g., current per fuel into the fuel cell), and T_fc is the temperature of the fuel cell (e.g., the exhaust temperature into the combustor).

The power drawn from the fuel cell can be represented by:

$$Pelec=n*V*I$$

where n is the number of cells, V is the voltage, and I is the current. Here, the power generated by the fuel cell can be increased by drawing additional current (e.g., to charge a battery or capacitor for later use).

As the emulated flight conditions 522 and the fuel cell operating conditions 524 are related to the terms of the objective function 530 via the simulator 532, the simulator 532 is configured to determine values for the terms of the objective function 530 based on values of the flight conditions 522 and values of the fuel cell operating conditions 524. For example, the simulator 532 determines how the emulated flight conditions 522 and the fuel cell operating conditions 524 affect the performance and emissions of the gas turbine engine 100.

As there are various values for different emulated flight conditions 522 (e.g., representing various flight modes) and various possible objective functions 530 (e.g., that may be manually selected during operation of the engine 100), different sets of values that represent a plurality of fuel cell operating conditions 524 are determined. For example, referring to the table of FIG. 9, there are shown "n" sets of flight conditions 522 (e.g., according to various flight modes) and "m" objective functions 530 for each set of flight conditions 522. Accordingly, there are "m×n" sets of fuel cell operating conditions 524 that are determined, one for each of the different combinations of a set of flight conditions 522 and an objective function 530.

To determine the values for each set of fuel cell operating conditions 524, an objective function 530 is selected from the "m" objective functions 530 and the values for the flight conditions 522 are selected from the "n" sets of flight conditions 522.

Values for the fuel cell operating conditions 524 may be repeatedly selected from various sets of values for fuel cell operating conditions 524, for example, that cover a range of possible operating conditions of the integrated fuel cell and combustor assembly 200 and/or the fuel cell stacks 232, 234 (and, in some cases, that also cover operating conditions such as variable geometries and combustor equivalence ratio).

The range of possible operating conditions may be determined according to constraints including an increase in the hydrogen conversion rate ($CPO_x(H_2)$), an increase in fuel utilization (Uf), and an increase in the temperature of the fuel cell (T_fc), that the current or power drawn from the fuel cell (Pelec) increases, fuel from the fuel cell at the downstream end of the combustor 206 increases with respect to fuel at the upstream end of the combustor 206, and the temperature of the fuel cell (T_fc) decreases.

Additionally or alternatively, values for fuel cell operating conditions 524 may be iteratively determined.

As shown in FIG. 8, a first set of values of fuel cell operating conditions 524 and a selected set of values for the flight conditions 522 (e.g., selected from one of the "n" sets of flight conditions 522) are combined in the simulator 532 to determine the values of the terms of (and a first overall value of) the selected objective function 530 (e.g., selected from one of the "m" objective functions 530).

Feedback loop 534 represents that this step is repeated for multiple sets of values of fuel cell operating conditions 524 (e.g., second, third, etc.) resulting in multiple overall values for the selected objective function 530 (e.g., second, third, etc.).

One of the values (e.g., the second) of the selected objective function 530 is determined as that which is the best, preferred, optimal, etc. For example, it may be desired to minimize or maximize the value of the objective function 530 depending on the terms of the objective function 530. In some cases, the one of the values of the selected objective function 530 may be a value that is above or below a threshold value for the objective function 530.

The set of values of fuel cell operating conditions 524 (e.g., the second) that corresponds to the selected one of the values (e.g., the second) of the selected objective function 530 is then stored in the table of FIG. 9 (e.g., for use online or in-flight). In the table (e.g., in a row of FIG. 9), the selected set of values of fuel cell operating conditions 524 is associated with the associated objective function 530 selected from the "m" objective functions 530 and the associated values for the flight conditions 522 selected from the "n" sets of flight conditions 522.

The steps above are repeated for each combination of one of the "m" objective functions 530 and one of the "n" sets of flight conditions 522 resulting in "n×m" sets of fuel cell operating conditions 524. The sets of fuel cell operating conditions 524 are stored in the table of FIG. 9 along with an associated one of the "m" objective functions 530 and an associated one of the "n" sets of flight conditions 522.

The resulting table of FIG. 9 is an optimal, preferred, etc. set of fuel cell operating conditions 524 for different emulated flight conditions 522 and different (e.g., user-configurable or selectable) objective functions 530. In the table of FIG. 9, each row represents one optimal, preferred, best, etc. set of fuel cell operating conditions 524 at one given set of flight conditions 522 and for one specific objective function 530.

In the table of FIG. 9, n1, n2, n3 may each represent a set of flight conditions 522. For example, n1, n2, n3 may represent a set of flight conditions associated with a flight mode such as take off, cruise, descent, ground idle, flight idle, etc. For the objective functions 530, m1, m2, m3 may each represent an objective function 530 such as thrust and emissions, TSFC and emissions, power and emissions, etc. Each of the columns x1-x7 may represent a fuel cell operating condition in a set of fuel cell operating conditions 524. The fuel cell operating conditions 524 may include $H_2$ conversion rate, SOFC exhaust temperature, SOFC fuel utilization, SOFC current, late lean injection and other engine operating conditions such as variable geometry, and combustor equivalence ratio.

The data of the table of FIG. 9 may be used to train a tuning model used in real-time control. The tuning model may include a neural network model, a machine learning model, a kernel based model, a fuzzy logic, a deep learning model, combinations thereof, and the like.

As used herein, the term "machine learning model" refers to one or more mathematical models configured to find patterns in data and apply the determined pattern to new data sets to form a prediction. Different approaches, also referred to as categories of machine learning, are implemented depending on the nature of the problem to be solved and the type and volume of data. Categories of machine learning models include, for example, supervised learning, unsupervised learning, reinforcement learning, deep learning or a combination thereof.

Supervised learning utilizes a target or outcome variable such as a dependent variable which is to be predicted from a given set of predictors also referred to as an independent variable. These sets of variables are used to generate a function that maps labeled inputs to desired outputs. The training process is iterative and continues until the model achieves a desired level of accuracy on the training data. Machine learning models categorized as supervised learning algorithms and models include, for example, a neural network, regression, decision tree, random forest, k-nearest neighbors (kNN), logistic regression, or the like.

Unsupervised learning, unlike supervised learning, is a learning algorithm that does not use labeled data, thereby leaving it to determine structure from the inputs. In other words, the goal of unsupervised learning is to find hidden patterns in data through methods such as clustering. Some examples of unsupervised learning include Apriori algorithms or K-means. Reinforcement learning refers to machine learning models that are trained to make specific decisions. The machine learning model is exposed to an environment where it trains itself continually using trial and error. Such a model learns from past experience and tries to capture the best possible knowledge to make accurate business decisions. An example of reinforcement learning includes Markov decision process.

Deep learning is a method of machine learning that incorporates neural networks in successive layers to learn from data in an iterative manner. Deep learning can learn patterns from unstructured data. Deep learning algorithms perform a task repeatedly and gradually improve the outcome through deep layers that enable progressive learning. Deep learning can include supervised learning or unsupervised learning aspects. Some deep learning machine learning models are, for example, artificial neural networks (ANNs), convolutional neural networks (CNNs), recurrent neural networks (RNNs), long short-term memory/gated recurrent unit (GRU), self-organizing map (SOM), autoencoders (AE), and restricted Boltzman machine (RBM).

A machine learning model is understood as meaning any variety of mathematical model having at least one non-linear operation (e.g., a non-linear activation layer in the case of a neural network). A machine learning model is trained or optimized via minimization of one or more loss functions (e.g., minimization of cross entropy loss or negative log-likelihood) that are separate from the model itself. A training or optimization process seeks to optimize the model to reproduce a known outcome (low bias) as well as enabling the model to make accurate predictions from unseen experiences (low variance). The model's output may be any variety of things relevant to the task such as a predicted value, a classification, a sequence, or the like. In the present embodiments, the output may be clearance values and/or confidence levels associated with the predicted clearance values.

However, it is understood that utilization of a neural network model is merely one example of a machine learning model trained to predict a set of fuel cell operating conditions 524 based on flight conditions 522 and an objective function 530. The system includes implementing a neural network model referred to herein as the emissions tuning model 540 to predict fuel cell operating conditions 524 based on real-time flight conditions 542 (which includes signals form the one or more sensors of the aircraft) and a user-selected objective function 530.

For example, the emissions tuning model 540 may be trained using each row of the data of the table of FIG. 9, with the emulated flight conditions 522 and the objective functions 530 as the model input, and the fuel cell operating conditions 524 (including any variable engine operation conditions such as variable geometries or combustor equivalence ratio determined as part of the fuel cell operating conditions 524) as the output. In training mode, the data of the table of FIG. 9 provides simulated flight data is used to provide operating conditions and simulated sensor readings to the emissions tuning model 540.

The emissions tuning model 540 may be trained using a supervised or unsupervised method, optionally with a feedback loop to tune the weights of the nodes of the emissions tuning model 540 to achieve accurate predictions of the fuel cell operating conditions 524 under real operational conditions (e.g., using true or real-time flight conditions 542).

Figure 10:
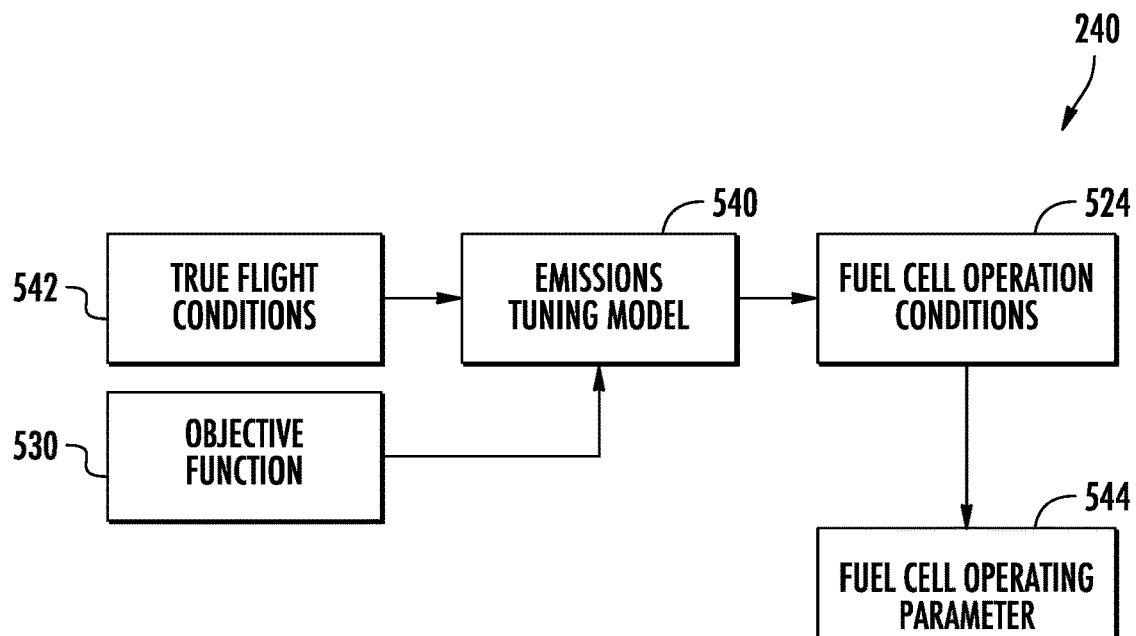
FIG. 10 is a flow diagram of the controller of FIG. 8 in accordance with an exemplary aspect of the present disclosure.

Referring now to FIG. 10, a real time application of the table of FIG. 9 (e.g., the emissions tuning model 540 trained based on the data of the table of FIG. 9) by the controller 240 is illustrated. In the real time flight operation, the controller 240 determines real-time or true flight condition 542 and a user-selected objective function 530. The controller 240 may determine values for the true flight conditions 542 (e.g., from sensors).

The emissions tuning model 540 may match the values of the true flight conditions 542 and the selected objective function 530 to a set of fuel cell operating conditions 524. For example, the emissions tuning model 540 may be the tuning model described above that is trained on the data of the table of FIG. 9. Accordingly, the emissions tuning model 540 may identify a set of fuel cell operating conditions 524 where the values of the true flight conditions 542 most closely resemble the values of the emulated flight conditions 522 associated with the identified set of fuel cell operating conditions 524 (e.g., same row of the table of FIG. 9) and where the user-selected objective function 530 is the objective function 530 associated with the identified set of fuel cell operating conditions 524 (e.g., same row of the table of FIG. 9).

The fuel cell operating conditions 524 may be the output of the emissions tuning model 540 where the user-selected objective function 530 is input to the tuning model and the true flight conditions 542 replace the emulated flight conditions 522 as input to the tuning model.

For example, if the values of the true flight conditions 542 match the values of a first set of emulated flight conditions 522 (e.g., including a combustor temperature below the lower limit 502), a first set of operating conditions 524 that are associated with the first set of emulated flight conditions 522 are determined.

If the values of the true flight conditions 542 match a second set of the emulated flight conditions 522 (e.g., including a combustor temperature above the upper limit 504), the second set of operating conditions 524 that are associated with the second set of emulated flight conditions 522 are determined.

The controller 240 may control fuel cell operating parameter(s) 544 according to fuel cell operating conditions 524 (e.g., to achieve the fuel cell operating conditions 524). The fuel cell operating parameter 544 may include a parameter of the gas turbine engine 100, the fuel delivery system 146, and the fuel cell and combustor assembly 200.

For example, the fuel cell operating parameter 544 may include an operating parameter of the air processing unit 306, the fuel processing unit 304, the power converter 324, the valves 235A, 235B, or a combination thereof.

Additionally, or alternatively, the fuel cell operating parameter 544 may include an air flowrate to the air processing unit 306, the fuel cell stack 294, or both; a fuel flowrate to the fuel processing unit 304, the fuel cell stack 294, or both; a bypass ratio of airflow around the air processing unit 306; a fuel flowrate to the air processing unit 306; a temperature, a pressure, or both of an airflow provided to the fuel cell assembly 204; a composition of the output products of the fuel cell assembly 204 provided to the combustion chamber 228; a ratio of one or more of these parameters between two or more fuel cell stacks (e.g., a first fuel cell stack 232 and a second fuel cell stack 234; see FIG. 2) of the fuel cell assembly 204; a combination of two or more of these parameters; etc.

For example, to achieve a set of fuel cell operating conditions 524, the controller 240 may control the air processing unit 306 to set the fuel cell temperature (T_fc), may control the reformer or fuel processing unit 304 to set the hydrogen conversion rate ($CPO_x(H_2)$) and the fuel utilization (Uf), may control the power converter 324 to set the current (I) drawn from the fuel cell stack 294 and the fuel utilization (Uf), The fuel utilization may be represented by the amount of current drawn from the fuel cell stack 294 with respect to the amount of fuel into the fuel cell stack 294. Additionally, or alternatively, any other suitable valves or the like may be controlled to influence the above fuel cell operating conditions 524.

In addition, the controller 240 may control the settings of the valves 235A, 235B to control the distribution of flow of fuel to the fuel cell stack 234A, 234B and into the combustor 206. The controller 240 may otherwise control parameters of two or more fuel cell stacks (e.g., a first fuel cell stack 232 and a second fuel cell stack 234; see FIG. 2) relative to one another as part of controlling the fuel cell operating parameter. As described above, fuel cell stacks 234A, 234B may be arranged along a length of the combustion chamber 228, such that the controller 240 may control aspects of output products injected along the length of the combustion chamber.

In some embodiments, the tuning model may be improved using values for true flight conditions 542 in place of or in addition to emulated flight conditions 522. Here, values for the true flight conditions 542 can used in place of the emulated flight conditions 522 in the method of FIG. 8 to tune, augment, or update the tuning model and/or the table of FIG. 9.

For example, if new values for a set of operating conditions 524 and the true flight conditions 542 determine a value of the objective function 530 that is improved (e.g., depending on whether the objective function is to be minimized or maximized) with respect to a value of the objective function 530 that is determined by previous values for the set of operating conditions 524 (e.g., determined with emulated flight conditions 522) and values for the true flight conditions 542, the table of FIG. 9 and/or the tuning model may be updated.

The tuning may be performed in real time by an aircraft system (e.g., controller 240), in real-time remotely by a computing device or controller that is separate from the aircraft, offline by an aircraft system or a remote computing device, combinations thereof, and the like.

Figure 11:
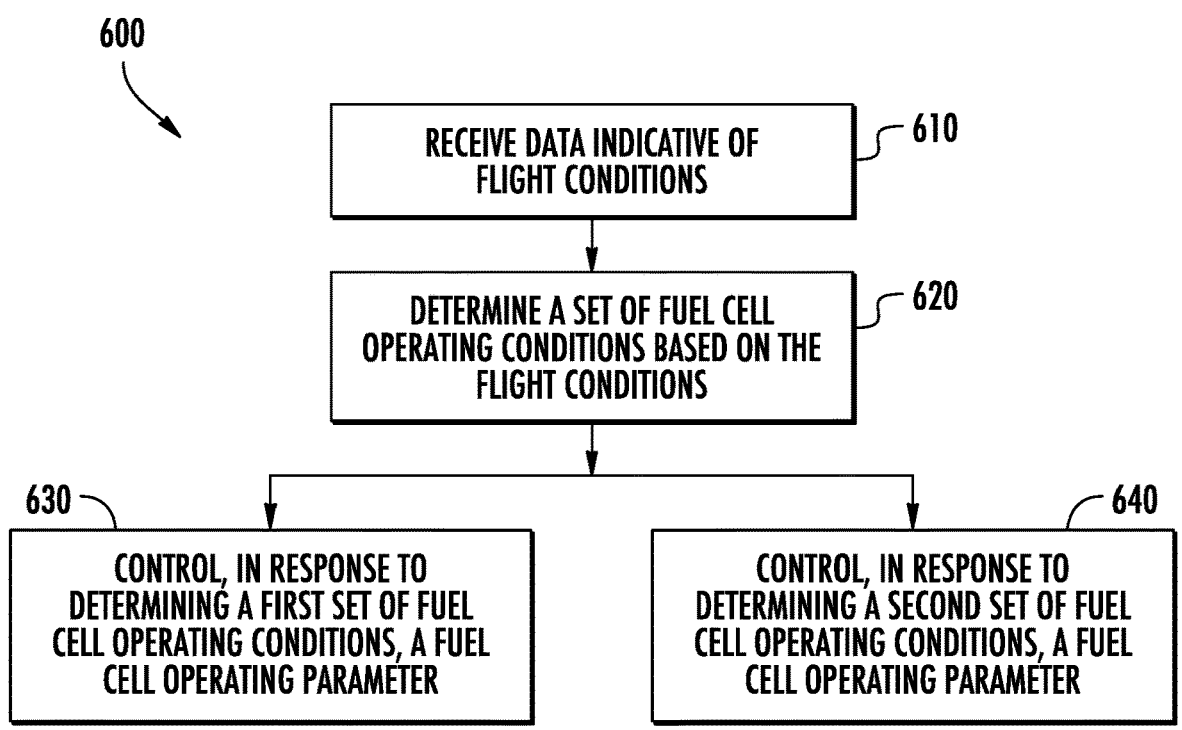
FIG. 11 is a flow diagram of a method in accordance with an exemplary aspect of the present disclosure.

Referring to FIG. 11, according to a first step 610 of an exemplary method 600, the controller 240 receives data indicative of flight conditions 522. For at least certain exemplary aspects, the data indicative of the flight conditions 522 includes data indicative of a thrust demand (which may include a fan speed demand) and data indicative of a temperature of the combustor 206. The data indicative of a temperature of the combustor 206 can include the current temperature, a predicted temperature in response to a change in combustor power, a predicted rate of change or direction of movement of the temperature in response to the change in combustor power, combinations thereof, and the like.

According to a second step 620, the controller 240 determines a set of fuel cell operating conditions 524 based on the flight conditions 522.

The controller 240 determines a first set of fuel cell operating conditions 524 where the flight conditions 522 include a temperature or predicted temperature of the combustor 206 that is approaching (e.g., direction or rate of change) or has crossed over the lower limit 502.

The first set of fuel cell operating conditions 524 may include a higher temperature of the fuel cell (T_fc), a higher hydrogen conversion rate for $CPO_x$ ($CPO_x(H_2)$), and a higher fuel utilization (Uf).

Alternatively, the controller 240 determines a second set of fuel cell operating conditions 524 where the flight conditions 522 include a temperature or predicted temperature of the combustor 206 that is approaching (e.g., direction or rate of change) or has crossed over the upper limit 504.

The second set of fuel cell operating conditions 524 may include increasing the current (I) drawn from the fuel cell stack 294, reducing the fuel cell exhaust gas temperature, injecting the combustion gases 266 from the fuel cell stack 294 toward the exit of the combustor 206 (e.g., late lean).

According to a third step 630, the controller 240, in response to determining the first set of fuel cell operating conditions 524, the controller 240 controls a fuel cell operating parameter 544 to achieve the first set of fuel cell operating conditions 524.

For example, the controller 240 controls the air processing unit 306 to increase the temperature of the fuel cell (T_fc), controls the fuel processing unit 304 to increase the amount of hydrogen conversion rate ($CPO_x(H_2)$), increases the fuel utilization (Uf) of the fuel cell stack 294, and controls the valve 151C to decrease the amount of direct fuel to the combustor 206. As the fuel utilization (Uf) reflects the amount of current (I) with respect to an amount of fuel into the fuel cell stack 294, the controller 240 may control the first power converter 324 to increase the current drawn from the fuel cell.

The first set of fuel cell operating conditions 524 increases the temperature of the combustor 206 to move the temperature of the combustor 206 toward or into the temperature range 500 while contributing to or meeting the thrust demand or another term of the objective function 530.

The increased temperature at the air processing unit 306 increases the temperature of the fuel cell exhaust gases 266 flowing into the combustor 206. The hydrogen-rich fuel from the fuel cell stack 294 increases the temperature (e.g., increasing the equivalence ratio raises the combustion flame temperature, which accelerates the rate of oxidation so that CO emissions decline) and the efficiency of fuel burned in the combustor 206. Due to the increase in fuel utilization, more hydrogen is consumed (e.g., converted to electricity) in the fuel cell stack 294 and less fuel from the fuel cell stack 294 exhausts into the combustor 206, allowing for increased efficiency.

In combination, the increase in temperature of the exhaust gas 266 from the fuel cell stack 294 into the combustor 206, the hydrogen-rich fuel from the fuel cell stack 294, and the reduced amount of fuel from the fuel cell stack 294 increases the temperature of the combustor 206 and the efficiency of the burning of fuel in the combustor 206. The combustor 206 more efficiently burns a smaller amount of hydrogen-rich fuel at a higher temperature, thereby raising the temperature of the combustor 206, which further improves the efficiency of the combustor 206.

Alternatively, according to a fourth step 640, in response to determining the second set of fuel cell operating conditions 524, the controller 240 controls a fuel cell operating parameter 544 to achieve the second set of fuel cell operating conditions 524.

The controller 240 controls the first power converter 324 to increase the current (I) drawn from the fuel cell stack 294, controls the air processing unit 306 to decrease the temperature of the fuel cell (T_fc), and controls the valves 235A, 235B to inject combustion gases 266 toward the exit of the combustor 206.

The second set of fuel cell operating conditions 524 decreases the temperature of the combustor 206 to move the temperature of the combustor 206 toward or into the temperature range 500 while contributing to or meeting thrust demand or another term of the objective function 530.

Due to the increase in current (I) drawn by the first power converter 324, more hydrogen is consumed (e.g., converted to electricity) in the fuel cell and less fuel from the fuel cell exhausts into the combustor. Accordingly, the fuel cell provides less combustible gas into the combustor, which acts as a vaporizer to reduce $NO_x$. A stream of less combustible gas may be referred to as a high-purity stream. The high-purity stream quenches the $NO_x$ reactions. $NO_x$ decreases exponentially with increasing water or steam injection or increasing specific humidity.

Due to the decrease in fuel cell temperature (T_fc) by the air processing unit 306, $NO_x$ decreases. As $NO_x$ increases with the air inlet temperature (e.g., the fuel cell exhaust gas temperature), reducing the fuel cell exhaust temperature will also reduce the $NO_x$.

Injecting combustion gas 266 towards the exit of the combustor 206 (late lean) reduces the residence time of the combustion gases 266 and therefore lowers $NO_x$.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

A gas turbine engine, comprising: a fuel cell assembly comprising a fuel cell stack and defining a fuel cell assembly operating parameter; a fuel source; a turbomachine comprising a compressor section, a combustor, and a turbine section arranged in serial flow order, the combustor configured to receive a flow of fuel from the fuel source and further configured to receive output products from the fuel cell stack; and a controller comprising memory and one or more processors, the memory storing instructions that when executed by the one or more processors cause the controller to perform operations including: receiving data indicative of system operation conditions, the data comprising data indicative of a performance demand and a system emission output; determining a set of fuel cell operating conditions to move the system emission output into or maintain the system emission output within an emissions range; and controlling the fuel cell assembly operating parameter according to the determined set of fuel cell operating conditions.

The gas turbine engine of one or more of these clauses, the operations further including determining the set of fuel cell operating conditions to contribute to the performance demand.

The gas turbine engine of one or more of these clauses, wherein data indicative of systems emission output includes at least one of a temperature of the combustor, a rate of change of the temperature of the combustor, and a direction of change of the temperature of the combustor.

The gas turbine engine of one or more of these clauses, wherein determining the set of fuel cell operating conditions comprises: determining a first set of fuel cell operating conditions in response determining that the temperature of the combustor is approaching or has fallen below a lower limit of a temperature range; or determining a second set of fuel cell operating conditions in response to determining that the temperature of the combustor is approaching or has exceeded an upper limit of the temperature range; and wherein controlling the fuel cell assembly operating parameter comprises controlling the fuel cell assembly operating parameter according to the determined one of the first set of fuel cell operating conditions or the second set of fuel cell operating conditions.

The gas turbine engine of one or more of these clauses, wherein a tuning model determines the set of fuel cell operating conditions, wherein the tuning model is trained on data including: a first set of flight conditions associated with the first set of fuel cell operating conditions; and a second set of flight conditions associated with the second set of fuel cell operating conditions.

The gas turbine engine of one or more of these clauses, wherein the first set of fuel cell operating conditions corresponds to at least one of a higher temperature of the fuel cell stack, a higher hydrogen conversion rate, and a higher fuel utilization.

The gas turbine engine of one or more of these clauses, wherein the fuel cell assembly comprises an air processing unit, a fuel processing unit, and a power converter, wherein controlling the fuel cell assembly operating parameter comprises controlling at least one of: the air processing unit to increase a temperature of the fuel cell stack; the fuel processing unit to increase a hydrogen conversion rate; and the power converter to increase a current drawn from the fuel cell stack.

The gas turbine engine of one or more of these clauses, wherein the first set of fuel cell operating conditions comprises a lower amount of fuel into directly into the combustor, wherein the controller is configured to control a valve to decrease an amount of fuel being provided directly into the combustor.

The gas turbine engine of one or more of these clauses, wherein the second set of fuel cell operating conditions corresponds to at least one of increasing a current drawn from the fuel cell stack, decreasing an exhaust gas temperature from the fuel cell stack, and injecting output products from the fuel cell stack at a downstream end of the combustor.

The gas turbine engine of one or more of these clauses, wherein the fuel cell assembly comprises an air processing unit, a fuel processing unit, and a power converter, wherein controlling the fuel cell assembly operating parameter comprises controlling at least one of: the power converter to increase the current drawn from the fuel cell stack; the air processing unit to decrease the exhaust gas temperature from the fuel cell stack; and the fuel processing unit to inject combustion gases from the fuel cell stack at a downstream end of the combustor.

A method of operating a gas turbine engine, the gas turbine engine comprising a fuel cell assembly comprising a fuel cell stack and a turbomachine, the turbomachine comprising a combustor configured to receive a flow of fuel from a fuel supply of the gas turbine engine and further configured to receive output products from the fuel cell stack, the method comprising: receiving data indicative of system operation conditions, the data comprising data indicative of a performance demand and a system emission output; determining a set of fuel cell operating conditions to move the system emission output into or maintain the system emission output within an emissions range; and controlling the fuel cell assembly operating parameter according to the determined set of fuel cell operating conditions.

The method of one or more of these clauses, comprising determining the set of fuel cell operating conditions to contribute to the performance demand.

The method of one or more of these clauses, wherein data indicative of systems emission output includes at least one of a temperature of the combustor, a rate of change of the temperature of the combustor, and a direction of change of the temperature of the combustor.

The method of one or more of these clauses, wherein determining the set of fuel cell operating conditions comprises: determining a first set of fuel cell operating conditions in response determining that a temperature of the combustor is approaching or has fallen below a lower limit of a temperature range; or determining a second set of fuel cell operating conditions in response to determining that a temperature of the combustor is approaching or has exceeded an upper limit of the temperature range.

The method of one or more of these clauses, wherein controlling the fuel cell assembly operating parameter comprises controlling the fuel cell assembly operating parameter according to the determined one of the first set of fuel cell operating conditions or the second set of fuel cell operating conditions.

The method of one or more of these clauses, wherein the first set of fuel cell operating conditions corresponds to at least one of a higher temperature of the fuel cell stack, a higher hydrogen conversion rate, and a higher fuel utilization.

The method of one or more of these clauses, wherein controlling the fuel cell assembly operating parameter comprises controlling at least one of: an air processing unit to increase a temperature of the fuel cell stack; a fuel processing unit to increase a hydrogen conversion rate; and a power converter to increase a current drawn from the fuel cell stack.

The method of one or more of these clauses, wherein the first set of fuel cell operating conditions comprises a lower amount of fuel into directly into the combustor, wherein the controller is configured to control a valve to decrease an amount of fuel being provided directly into the combustor.

The method of one or more of these clauses, wherein the second set of fuel cell operating conditions corresponds to at least one of increasing a current drawn from the fuel cell stack, decreasing an exhaust gas temperature from the fuel cell stack, and injecting output products from the fuel cell stack at a downstream end of the combustor.

The method of one or more of these clauses, wherein controlling the fuel cell assembly operating parameter comprises controlling at least one of: a power converter to increase the current drawn from the fuel cell stack; an air processing unit to decrease the exhaust gas temperature from the fuel cell stack; and a fuel processing unit to inject combustion gases from the fuel cell stack at a downstream end of the combustor.

We claim:

1. A gas turbine engine, comprising:
  a fuel cell assembly comprising a fuel cell stack and defining a fuel cell assembly operating parameter;
  a fuel source;
  a turbomachine comprising a compressor section, a combustor, and a turbine section arranged in serial flow order, the combustor configured to receive a flow of fuel from the fuel source and further configured to receive output products from the fuel cell stack; and
  a controller comprising memory and one or more processors, the memory storing instructions that when executed by the one or more processors cause the controller to perform operations including:
    receiving data indicative of system operation conditions, the data comprising data indicative of a performance demand and a system emission output, wherein the data indicative of systems emission output includes data indicative of at least one of a temperature of the combustor, a rate of change of the temperature of the combustor, and a direction of change of the temperature of the combustor;
    determining a set of fuel cell operating conditions to move the system emission output into or maintain the system emission output within an emissions range, wherein determining the set of fuel cell operating conditions comprises: determining a first set of fuel cell operating conditions in response determining that the temperature of the combustor is approaching or has fallen below a lower limit of a temperature range; or determining a second set of fuel cell operating conditions in response to determining that the temperature of the combustor is approaching or has exceeded an upper limit of the temperature range; and
    controlling the fuel cell assembly operating parameter according to the determined set of fuel cell operating conditions, wherein controlling the fuel cell assembly operating parameter comprises controlling the fuel cell assembly operating parameter according to the determined one of the first set of fuel cell operating conditions or the second set of fuel cell operating conditions.

2. The gas turbine engine of claim 1, the operations further including determining the set of fuel cell operating conditions to contribute to the performance demand.

3. The gas turbine engine of claim 1, wherein a tuning model determines the set of fuel cell operating conditions, wherein the tuning model is trained on data including:
  a first set of flight conditions associated with the first set of fuel cell operating conditions; and
  a second set of flight conditions associated with the second set of fuel cell operating conditions.

4. The gas turbine engine of claim 1, wherein the first set of fuel cell operating conditions corresponds to at least one of an increased temperature of the fuel cell stack, an increased hydrogen conversion rate, and an increased fuel utilization.

5. The gas turbine engine of claim 4, wherein the fuel cell assembly comprises an air processing unit, a fuel processing unit, and a power converter, wherein controlling the fuel cell assembly operating parameter comprises controlling at least one of:
  the air processing unit to increase the temperature of the fuel cell stack;
  the fuel processing unit to increase the hydrogen conversion rate; and
  the power converter to increase a current drawn from the fuel cell stack.

6. The gas turbine engine of claim 5, wherein the first set of fuel cell operating conditions comprises a decreased amount of fuel provided directly into the combustor, wherein the controller is configured to control a valve to decrease the amount of fuel being provided directly into the combustor.

7. The gas turbine engine of claim 1, wherein the second set of fuel cell operating conditions corresponds to at least one of increasing a current drawn from the fuel cell stack, decreasing an exhaust gas temperature from the fuel cell stack, and injecting output products from the fuel cell stack at a downstream end of the combustor.

8. The gas turbine engine of claim 7, wherein the fuel cell assembly comprises an air processing unit, a fuel processing unit, and a power converter, wherein controlling the fuel cell assembly operating parameter comprises controlling at least one of:
  the power converter to increase the current drawn from the fuel cell stack;
  the air processing unit to decrease the exhaust gas temperature from the fuel cell stack;
  and the fuel processing unit to inject combustion gases from the fuel cell stack at the downstream end of the combustor.

9. A method of operating a gas turbine engine, the gas turbine engine comprising a fuel cell assembly comprising a fuel cell stack and a turbomachine, the turbomachine comprising a combustor configured to receive a flow of fuel from a fuel supply of the gas turbine engine and further configured to receive output products from the fuel cell stack, the method comprising:
  receiving data indicative of system operation conditions, the data comprising data indicative of a performance demand and a system emission output, wherein the data indicative of system emission output includes data indicative of at least one of a temperature of the combustor, a rate of change of the temperature of the combustor, and a direction of change of the temperature of the combustor;
  determining a set of fuel cell operating conditions to move the system emission output into or maintain the system emission output within an emissions range, wherein determining the set of fuel cell operating conditions comprises: determining a first set of fuel cell operating conditions in response determining that the temperature of the combustor is approaching or has fallen below a lower limit of a temperature range; or determining a second set of fuel cell operating conditions in response to determining that the temperature of the combustor is approaching or has exceeded an upper limit of the temperature range; and controlling a fuel cell assembly operating parameter defined by the fuel cell assembly according to the determined set of fuel cell operating conditions.

10. The method of claim 9, comprising determining the set of fuel cell operating conditions to contribute to the performance demand.

11. The method of claim 9, wherein controlling the fuel cell assembly operating parameter comprises controlling the fuel cell assembly operating parameter according to the first set of fuel cell operating conditions.

12. The method of claim 9, wherein the first set of fuel cell operating conditions corresponds to at least one of an increased temperature of the fuel cell stack, an increased hydrogen conversion rate, and an increased fuel utilization.

13. The method of claim 12, wherein controlling the fuel cell assembly operating parameter comprises controlling at least one of:
    an air processing unit to increase the temperature of the fuel cell stack;
    a fuel processing unit to increase the hydrogen conversion rate; and
    a power converter to increase a current drawn from the fuel cell stack.

14. The method of claim 12, wherein the first set of fuel cell operating conditions comprises a decreased amount of fuel provided directly into the combustor, wherein the controller is configured to control a valve to decrease the amount of fuel being provided directly into the combustor.

15. The method of claim 9, wherein the second set of fuel cell operating conditions corresponds to at least one of increasing a current drawn from the fuel cell stack, decreasing an exhaust gas temperature from the fuel cell stack, and injecting output products from the fuel cell stack at a downstream end of the combustor.

16. The method of claim 15, wherein controlling the fuel cell assembly operating parameter comprises controlling at least one of:

a power converter to increase the current drawn from the fuel cell stack;
an air processing unit to decrease the exhaust gas temperature from the fuel cell stack; and
a fuel processing unit to inject combustion gases from the fuel cell stack at the downstream end of the combustor.

17. A controller for a gas turbine engine, the gas turbine engine comprising a fuel cell assembly, a fuel source, and a turbomachine comprising a combustor, the fuel cell assembly comprising a fuel cell stack and defining a fuel cell assembly operating parameter, the combustor configured to receive a flow of fuel from the fuel source and further configured to receive output products from the fuel cell stack, the controller comprising memory and one or more processors, the memory storing instructions that when executed by the one or more processors cause the controller to perform operations, the operations including:
    receiving data indicative of system operation conditions, the data comprising data indicative of a performance demand and a system emission output, wherein the data indicative of the systems emission output includes data indicative of at least one of a temperature of the combustor, a rate of change of the temperature of the combustor, and a direction of change of the temperature of the combustor;
    determining a set of fuel cell operating conditions to move the system emission output into or maintain the system emission output within an emissions range, wherein determining the set of fuel cell operating conditions comprises: determining a first set of fuel cell operating conditions in response determining that the temperature of the combustor is approaching or has fallen below a lower limit of a temperature range; or determining a second set of fuel cell operating conditions in response to determining that the temperature of the combustor is approaching or has exceeded an upper limit of the temperature range; and
    controlling the fuel cell assembly operating parameter according to the determined set of fuel cell operating conditions.

18. The controller of claim 17, wherein controlling the fuel cell assembly operating parameter comprises controlling the fuel cell assembly operating parameter according to the first set of fuel cell operating conditions.

* * * * *